United States Patent
De

(10) Patent No.: US 12,189,591 B2
(45) Date of Patent: Jan. 7, 2025

(54) DATA INDEX MANAGEMENT METHOD AND APPARATUS IN STORAGE SYSTEM

(71) Applicant: HUAWEI TECHNOLOGIES CO., LTD., Guangdong (CN)

(72) Inventor: Yuxin De, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 10 days.

(21) Appl. No.: 17/846,208

(22) Filed: Jun. 22, 2022

(65) Prior Publication Data

US 2022/0327102 A1    Oct. 13, 2022

Related U.S. Application Data

(63) Continuation of application No. PCT/CN2020/134025, filed on Dec. 4, 2020.

(30) Foreign Application Priority Data

Dec. 23, 2019    (CN) .......................... 201911342473.9
Dec. 26, 2019    (CN) .......................... 201911369404.7

(51) Int. Cl.
*G06F 16/22* (2019.01)
*G06F 12/02* (2006.01)
(Continued)

(52) U.S. Cl.
CPC ...... *G06F 16/2228* (2019.01); *G06F 12/0292* (2013.01); *G06F 12/04* (2013.01); *G06F 12/10* (2013.01)

(58) Field of Classification Search
CPC ... G06F 16/2228; G06F 16/0292; G06F 12/04
See application file for complete search history.

(56) References Cited

U.S. PATENT DOCUMENTS

2015/0254288 A1*   9/2015   Garth .................... G06F 9/5005
                                                                    707/753
2015/0347477 A1   12/2015   Esmet et al.
(Continued)

FOREIGN PATENT DOCUMENTS

CN         103440208 A        12/2013
CN         103942114 A         7/2014
(Continued)

OTHER PUBLICATIONS

Office Action for Chinese Application No. 201911369404 dated Feb. 14, 2023, 7 pages.
(Continued)

*Primary Examiner* — Loc Tran

(57) ABSTRACT

The technology of this application relates to a data index management method and apparatus in a storage system, and relates to the field of computer technologies, to help create a data index by using a data index operation unit with a proper grain, thereby reducing storage space occupied by data indexes. The method includes obtaining first to-be-written data, where a logical address range of the first to-be-written data is a first logical address range, and generating a data index based on an alignment status between a logical address range of a to-be-generated data index in the first logical address range and data index operation units with different lengths in the storage system, where the storage system includes a data index operation unit with a first length and a data index operation unit with a second length, and the first length is greater than the second length.

18 Claims, 15 Drawing Sheets

(51) Int. Cl.
G06F 12/04 (2006.01)
G06F 12/10 (2016.01)

(56) References Cited

U.S. PATENT DOCUMENTS

2017/0090754 A1   3/2017   Horn
2018/0081897 A1   3/2018   Jiang et al.
2020/0242045 A1*  7/2020   Ramamurthy ...... G06F 12/1009

FOREIGN PATENT DOCUMENTS

| CN | 107329704 A | 11/2017 |
| CN | 110471861 A | 11/2019 |
| CN | 111241090 A | 6/2020 |
| EP | 0942381 A2 | 9/1999 |

OTHER PUBLICATIONS

PCT International Search Report for PCT/CN2020/134025 dated Dec. 4, 2020, 11 pages.
Extended European Search Report for EP Application No. 20907053 dated Nov. 29, 2022, 7 pages.

* cited by examiner

DATA INDEX MANAGEMENT METHOD AND APPARATUS IN STORAGE SYSTEM

CROSS-REFERENCE TO RELATED APPLICATIONS

This application is a continuation of International Application No. PCT/CN2020/134025, filed on Dec. 4, 2020, which claims priority to Chinese Patent Application No. 201911342473.9, filed on Dec. 23, 2019 and claims priority to Chinese Patent Application No. 201911369404.7, filed on Dec. 26, 2019. All of the aforementioned patent applications are hereby incorporated by reference in their entireties.

TECHNICAL FIELD

This application relates to the field of computer technologies, and in particular, to a data index management method and apparatus in a storage system.

BACKGROUND

A data index is used to quickly query data. The data index can be used to make data semantics invisible and provide consistent and efficient storage services. A data index is generated by using a storage address of data in a storage system on a specific data index operation unit basis.

A storage system creates a data index by using a data index operation unit with a fixed grain. A data access requirement cannot be met based on data access diversity in the storage system. Therefore, how to create a data index by using a data index operation unit with a proper grain becomes an issue to be resolved in a storage system.

SUMMARY

Embodiments of this application provide a data index management method and apparatus in a storage system, to help create a data index by using a data index operation unit with a proper grain, thereby reducing storage space occupied by data indexes.

According to a first aspect, a data index management method in a storage system is provided, including: obtaining first to-be-written data, where a logical address range of the first to-be-written data is a first logical address range; and then generating a data index based on an alignment status between a logical address range of a to-be-generated data index in the first logical address range and data index operation units with different lengths in the storage system, where the storage system includes a data index operation unit with a first length and a data index operation unit with a second length, and the first length is greater than the second length. In this technical solution, a data index can be generated based on the data index operation units with the different lengths. When it is ensured that a same logical address range is aligned with a corresponding data index operation unit, generating a data index based on a data index operation unit with a larger length leads to a smaller quantity of data indexes, thereby reducing storage space occupied by the data indexes. Therefore, using this technical solution is conducive to reducing the storage space occupied by the data indexes. In an example, the logical address range of the to-be-generated data index can be understood as a logical address range that is in the first logical address range and that is not involved in a data index generation operation.

In a possible implementation, the generating a data index based on an alignment status between a logical address range of a to-be-generated data index in the first logical address range and data index operation units with different lengths in the storage system specifically includes: when the logical address range of the to-be-generated data index is aligned with the data index operation unit with the first length, generating a first data index for first data based on the data index operation unit with the first length, where the first data is data, in the first to-be-written data, that starts from the $1^{st}$ logical address in the logical address range of the to-be-generated data index and that is in a logical address range whose length is the first length, and the first data index includes a location of the first data in the storage system.

In a possible implementation, the generating a data index based on an alignment status between a logical address range of a to-be-generated data index in the first logical address range and data index operation units with different lengths in the storage system specifically includes: when the logical address range of the to-be-generated data index is not aligned with the data index operation unit with the first length, generating a second data index for second data based on the data index operation unit with the second length, where the second data is data, in the first to-be-written data, that starts from the $1^{st}$ logical address in the logical address range of the to-be-generated data index and that is in a logical address range whose length is the second length, and the second data index includes a location of the second data in the storage system.

In this way, generating the data index preferentially based on the data index operation unit with a larger length leads to a smaller quantity of data indexes, thereby reducing the storage space occupied by the data indexes. In other words, in a data index generation procedure, the data index operation unit with a larger length has a higher priority.

In a possible implementation, when a length of the $1^{st}$ logical address in the logical address range of the to-be-generated data index is divisible by the first length, and a length of the logical address range of the to-be-generated data index is greater than or equal to the first length, the logical address range of the to-be-generated data index is aligned with the data index operation unit with the first length.

In a possible implementation, when a length of the $1^{st}$ logical address in the logical address range of the to-be-generated data index is not divisible by the first length, and/or a length of the logical address range of the to-be-generated data index is less than the first length, the logical address range of the to-be-generated data index is not aligned with the data index operation unit with the first length.

In a possible implementation, after the generating a first data index for first data based on the data index operation unit with the first length, the method further includes: when a first target data index already exists in the storage system, deleting the first target data index, where the first target data index is a data index generated for third data based on the data index operation unit with the second length, the logical address range of the first data includes a logical address range of the third data, and the first target data index includes a location of the third data in the storage system. This is conducive to reducing the storage space occupied by the data indexes, and improving garbage collection efficiency during garbage collection.

In a possible implementation, after the generating a first data index for first data based on the data index operation unit with the first length, the method further includes: when a first target data index already exists in the storage system, marking, by the storage system, the first target data index as invalid.

In a possible implementation, after the generating a second data index for second data based on the data index operation unit with the second length, the method further includes: when a second target data index already exists in the storage system, marking a status of a target section of the second target data index as invalid, where the second target data index is a data index generated for fourth data based on the data index operation unit with the first length, the target section is a data index generated for data in a second logical address range included in a logical address range of the fourth data, and the second logical address range is the same as the logical address range of the second data. This is conducive to distinguishing between new data and old data in a data query process and a garbage collection process, thereby improving data query efficiency and garbage collection efficiency.

In a possible implementation, the storage system may use a status bit to mark each section of the second target data index.

In a possible implementation, the method further includes: deleting the second target data index when statuses of all sections of the second target data index are marked as invalid. This is conducive to distinguishing between new data and old data in a garbage collection process, thereby improving garbage collection efficiency.

In a possible implementation, the method further includes: when a quantity of sections in an invalid state in all sections of the second target data index is greater than or equal to a threshold, generating anew data index from a section in a valid state in all the sections, and deleting the second target data index. This is conducive to further reducing the storage space occupied by the data indexes, and distinguishing between new data and old data in a garbage collection process, thereby improving garbage collection efficiency.

In a possible implementation, the method further includes: obtaining a to-be-queried logical address range; then, encoding the to-be-queried logical address range based on the second length, to obtain a first encoding result; next, querying the second data index based on the first encoding result, where the second data index includes the first encoding result; and finally, determining data in the to-be-queried logical address range based on the data indicated by the second data index.

In a possible implementation, the method further includes: when the first encoding result does not exist in the storage system, encoding the to-be-queried logical address range based on the first length, to obtain a second encoding result; then, querying the first data index based on the second encoding result, where the first data index includes the second encoding result; and next, determining the data in the to-be-queried logical address range based on the data indicated by the first data index.

In this way, the encoding result is obtained preferentially based on the data index operation unit with a smaller length, so that the data in the to-be-queried logical address range is determined based on the encoding result. This is conducive to ensuring that the found data in the to-be-queried logical address range is new data. In other words, in a data query procedure, the data index operation unit with a smaller length has a higher priority.

In a possible implementation, the 1$^{st}$ logical address in the first logical address range is divisible by the second length, and a length of the first logical address range is an integer multiple of the second length.

In a possible implementation, the obtaining first to-be-written data specifically includes: receiving a data write request, where the data write request includes the first to-be-written data; or receiving a data write request, where the data write request includes initial to-be-written data and an initial logical address range; and padding the initial to-be-written data based on the second length, to obtain the first to-be-written data. In other words, the first logical address range may be a logical address range carried in the write request, or a logical address range obtained after padding is performed based on the logical address range. In addition, performing data padding based on the data index operation unit with a smaller length is conducive to reducing read amplification.

In a possible implementation, the generating a first data index for first data based on the data index operation unit with the first length includes: encoding the logical address range of the first data based on the data index operation unit with the first length, to obtain a first encoding result, where the first data index (for example, a key in the first data index) includes the first encoding result.

In a possible implementation, the generating a second data index for second data based on the data index operation unit with the second length includes: encoding the logical address range of the second data based on the data index operation unit with the second length, to obtain a second encoding result, where the second data index (for example, a key in the second data index) includes the second encoding result.

A specific encoding method is not limited in this embodiment of this application. For example, refer to the conventional technology.

In a possible implementation, the storage system includes a first prefix tree and a second prefix tree, generation time of the first prefix tree is earlier than that of the second prefix tree, the first prefix tree includes the first data index, and the second prefix tree includes the second data index. The logical address range of the data indicated by the first data index includes the logical address range of the data indicated by the second data index. In this case, the method further includes: combining the first prefix tree and the second prefix tree to obtain a combined prefix tree. The combined prefix tree includes the first data index and the second data index. The first data index includes a plurality of sections, a target section of the plurality of sections is marked as invalid, and the target section is a section corresponding to the logical address range of the data indicated by the second data index. This possible implementation provides a prefix tree combination manner, to help distinguish between new data and old data in a data query procedure and a garbage collection procedure, thereby improving data query efficiency and garbage collection efficiency.

In a possible implementation, the storage system includes a first prefix tree and a second prefix tree, generation time of the first prefix tree is earlier than that of the second prefix tree, the first prefix tree includes the second data index, and the second prefix tree includes the first data index. The logical address range of the data indicated by the first data index includes the logical address range of the data indicated by the second data index. In this case, the method further includes: combining the first prefix tree and the second prefix tree to obtain a combined prefix tree. The combined prefix tree includes the first data index but does not include the second data index. This possible implementation provides another prefix tree combination manner, to help reduce storage resources occupied by the data index.

In a possible implementation, the method may further include: if the second encoding result does not exist in a cache of the storage system, reading the first data index from a hard disk of the storage system, where the logical address range corresponding to the first data index includes the to-be-queried logical address range; and if a status of a section that is in the first data index and that is corresponding to the to-be-queried logical address range is marked as valid, determining the data in the to-be-queried logical address range based on the data indicated by the first data index; or if a status of a section that is in the first data index and that is corresponding to the to-be-queried logical address range is marked as invalid, obtaining, from the hard disk, a second data index of a logical address range corresponding to the section. In this solution, the data is read from the cache preferentially based on the data index operation unit with a larger length. This is conducive to reducing a quantity of times of reading data from the hard disk, thereby increasing a data read rate.

According to a second aspect, a data index management apparatus in a storage system is provided. The apparatus is configured to perform the method provided in any one of the first aspect or the possible implementations of the first aspect. The apparatus may be a storage controller, a server, a chip, or the like.

In a possible implementation, the apparatus includes modules configured to perform the method provided in any one of the first aspect or the possible implementations of the first aspect.

In a possible implementation, the apparatus includes a memory and a processor. The memory is configured to store computer program instructions, and the processor is configured to invoke the computer program instructions, to perform the method provided in any one of the first aspect or the possible implementations of the first aspect.

According to a third aspect, a computer-readable storage medium is provided. The computer-readable storage medium stores computer program instructions, and when the computer program instructions are invoked by a computer, the computer is enabled to perform the method provided in any one of the first aspect or the possible implementations of the first aspect.

According to a fourth aspect, a computer program product is provided. When computer program instructions included in the computer program product are run on a computer, the method provided in any one of the first aspect or the possible implementations of the first aspect is performed.

It can be understood that, the data index management apparatus in the storage system, the computer-readable storage medium, and the computer program product that are provided above are all used to perform the corresponding data index management method in the storage system provided above. Therefore, for beneficial effects that can be achieved by the data index management apparatus, the computer-readable storage medium, or the computer program product, refer to the beneficial effects in the corresponding method.

DESCRIPTION OF EMBODIMENTS

Figure 1:
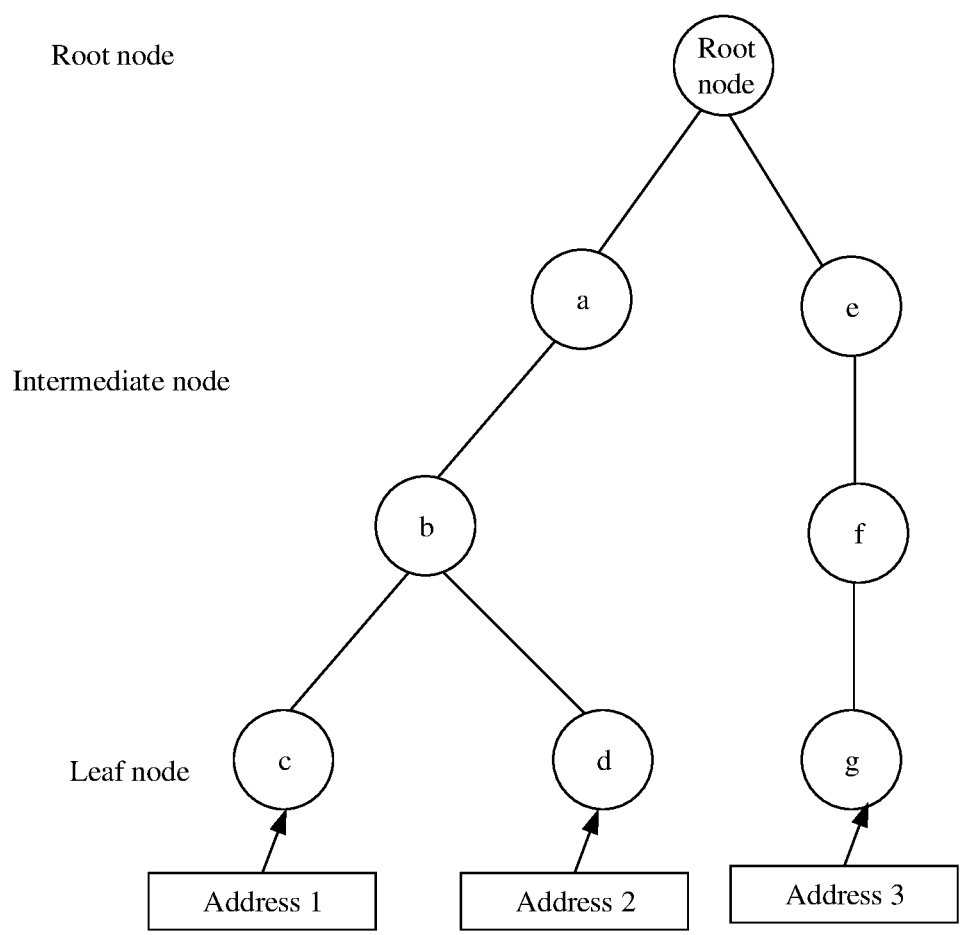
FIG. 1 is an example schematic diagram of a prefix tree to which an embodiment of this application is applicable.

The following describes related terms or technologies in embodiments of this application.

(1) Data Index

In a storage system, a data index is used to indicate a location of data in the storage system.

The storage system receives a data write request, where the data write request includes a logical address range of data. After storing the data into the storage system, the storage system creates a data index for the data. The data index usually includes a location of the data in the storage system. The location of the data in the storage system may be specifically a location of the data in a hard disk of the storage system, a location of the data on a volume of the storage system, or the like. To facilitate data index management and reduce a quantity of data indexes, the storage system may usually determine a key of the data based on an encoding result of the logical address range of the data, to create the data index for the data. In an implementation, the key may include an identifier of the data, an identifier of the volume in which the data is located, or an identifier of a file to which the data belongs. In another implementation, the key may include an encoding result of an identifier of the data, an encoding result of an identifier of the volume in which the data is located, or an encoding result of an identifier of a file to which the data belongs. The storage system usually performs data index management in a prefix tree form.

In embodiments of this application, a logical address is an access address provided by the storage system for a client. The location of the data in the storage system is a storage address that is inside the storage system and that is corresponding to the logical address, and is used to store the data. The client may be a host, a server, a virtual machine, an application, or the like.

The storage system receives a data query or read request, generates a corresponding key based on the identifier of the data and the logical address range of the data that are carried in the data query or read request, and queries whether a data index includes the key, to determine a location of the data in the storage system.

Using a file system as an example, a key may include identification information of a file in which data is located (or an encoding result of identification information of a file in which data is located) and an encoding result of a logical address range of the data. The identification information of the file may include a file name and/or a file path. An encoding mode of the identification information of the file is not limited in embodiments of this application. For brevity of description, the following uses "a key includes a file name of a file in which data is located and an encoding result of a logical address range of the data" as an example for description. An encoding mode of the logical address range of the data is not limited in embodiments of this application. For a specific example, refer to the following description.

In embodiments of this application, a length of data may be represented by using a logical address range of the data. For example, a length of data in a logical address range [0 bits, 7 bits] is 8 bits. An identifier of a length may be any type of information that uniquely represents the length. For example, the identifier of the length may be the length itself, or an identifier. For example, a binary number "1" is used to represent a first length, and a binary number "0" is used to represent a second length.

(2) Data Index Operation Unit (Grain)

A data index operation unit is also referred to as a data index grain, that is, a length of data indicated by a data index. The data index operation unit is corresponding to a minimum storage grain and a minimum operation grain of the data in the storage system, that is, a minimum logical address length.

Generally, when the storage system performs data read/write by using a data index, a logical address range of data needs to be aligned with a data index operation unit when the data is read/written once. This is conducive to reducing storage space occupied by the data indexes and increasing a read/write rate. In an example, that a logical address range of data is aligned with a data index operation unit when the data is read/written once may be as follows: An offset of the $1^{st}$ logical address of the data when the data is read/written once (for example, an offset of the $1^{st}$ logical address of the data relative to the $1^{st}$ logical address of a file in which the data is located) is divisible by a length of the data index operation unit, and a length of the data is equal to the length of the data index operation unit.

For example, when the data index operation unit is 8 bits, the offset of the $1^{st}$ logical address of the data when the storage system reads/writes the data once is an integer multiple of 8 bits, for example, 0 bits, 8 bits, 16 bits, or 24 bits. The logical address range of the data when the storage system reads/writes the data once may be: [0 bits, 7 bits], [8 bits, 15 bits], [16 bits, 23 bits], or the like.

For another example, when the data index operation unit is 32 bits, the offset of the $1^{st}$ logical address of the data when the storage system reads/writes the data once is an integer multiple of 32 bits, for example, 0 bits, 32 bits, or 64 bits. The logical address range of the data when the storage system reads/writes the data once may be: [0 bits, 31 bits], [32 bits, 63 bits], [64 bits, 95 bits], or the like.

(3) Prefix Tree

A prefix tree, also referred to as a dictionary tree, is an ordered tree used to store an associative array, where keys are usually strings. Unlike a binary search tree, a node does not directly store a key of the prefix tree, but a location of the node in the tree determines the key. All descendants of a node have a common prefix, that is, a string corresponding to the node, whereas a root node is corresponding to an empty string. Generally, not every node has a corresponding value, and only keys corresponding to leaf nodes and some interior nodes have associated values. In some embodiments of this application, a prefix tree may be used to manage data indexes.

FIG. 1 is a schematic diagram of a prefix tree to which an embodiment of this application is applicable. The prefix tree includes a root node, several intermediate nodes connected to the root node, and several leaf nodes connected to each intermediate node. Specifically, one data index may be formed by a root node and a leaf node in the prefix tree, and an intermediate node connecting the root node and the leaf node.

FIG. 1 shows three leaf nodes, and the three leaf nodes are respectively corresponding to data indexes 1 to 3. A key in the data index 1 is abc, a value corresponding to the key is an address 1 stored in a leaf node c, and the address is a location, in the storage system, of data indicated by the data index 1. A key in the data index 2 is abd, a value corresponding to the key is an address 2 stored in a leaf node d, and the address 2 is a location, in the storage system, of data indicated by the data index 2. A key in the data index 3 is efg, a value corresponding to the key is an address 3 stored in a leaf node g, and the address is a location, in the storage system, of data indicated by the data index 3.

(4) Logical Address Range Corresponding to a Data Index

A logical address range corresponding to a data index is a logical address range of data indicated by the data index.

(5) Garbage Collection

If data is written in an "append only" mode, when the data is modified, the data before the modification becomes invalid data in the storage system, that is, junk data. The data before the modification and modified data have a same logical address range, but have different locations in the storage system. In this case, a status of a data index used to indicate the data before the modification becomes invalid. Therefore, garbage collection needs to be performed.

Garbage collection can be understood as: sorting out data in the storage system to delete invalid data, and migrating valid data to compact data, thereby reducing occupied storage space.

In a specific implementation process, the storage system may perform garbage collection based on a data index operation unit. If a data index includes a plurality of sections, the data index is divided into data indexes with a plurality of sub-grains. For example, a first section of the data index includes a location of data in the storage system being an address A. Because the data in the address A is modified, that is, data is written into a logical address range of the data in the address A again, a status of the first section of the data index becomes invalid. During specific implementation, the storage system may allocate a status bit to each section of the data index, to represent a status of the section. When a quantity of sections in an invalid state in the data index reaches (that is, is greater than or equal to) a threshold, garbage collection is performed on the data indicated by the data index. Alternatively, when a quantity of sections in an invalid state in the data index reaches (that is, is greater than or equal to) a threshold, a section in a valid state in the data index may be formed into a new data index. When all sections of the data index become invalid, the data index may be directly deleted.

(6) Other Terms

In embodiments of this application, a term such as "example" or "for example" is used to represent giving an example, an illustration, or a description. Any embodiment or implementation scheme described as an "example" or "for example" in embodiments of this application should not be construed as being preferred or having advantages over another embodiment or implementation scheme. Exactly, use of the term such as "example" or "for example" is intended to present a related concept in a specific manner.

In embodiments of this application, "at least one" means one or more. "A plurality of" means two or more.

A term "and/or" in embodiments of this application describes only an association relationship between associated objects and represents that at least three relationships may exist. For example, A and/or B may represent the following three cases: Only A exists, both A and B exist, and only B exists. In addition, a character "/" in this specification generally indicates an "or" relationship between associated objects.

Figure 2:
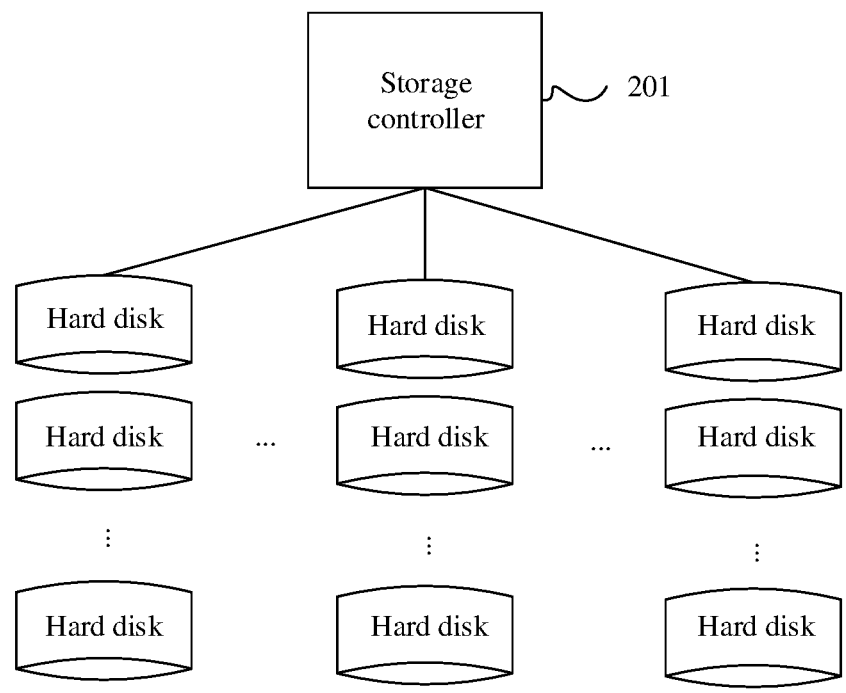
FIG. 2 is an example schematic diagram of a storage system to which an embodiment of this application is applicable.

The storage system in embodiments of this application may be a storage array. As shown in FIG. 2, the storage array includes a storage controller 201 and a plurality of hard disks. The hard disk includes a solid state drive (SSD), a magnetic disk, or the like.

Figure 3:
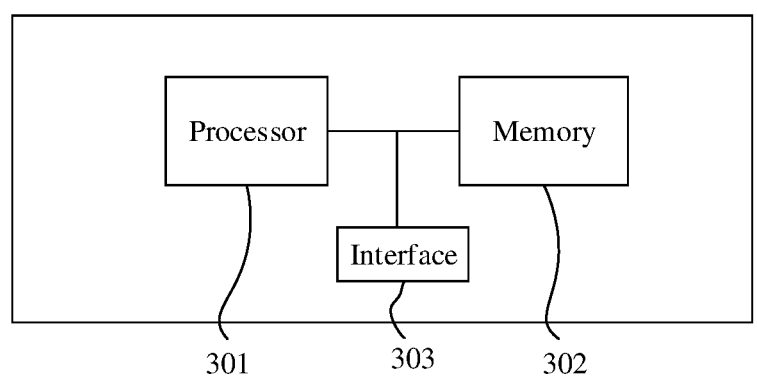
FIG. 3 is an example schematic diagram of a structure of a storage controller to which an embodiment of this application is applicable.

As shown in FIG. 3, the storage controller 201 includes a processor 301, a memory 302, and an interface 303. The memory 302 stores computer program instructions, and the processor 301 executes the computer program instructions in the memory 302, to perform management and data access operations on the storage system. A central processing unit (CPU), a field-programmable gate array (FPGA), or other hardware may serve as the processor 301, or an FPGA or other hardware and a CPU jointly serve as the processor 301. The processor 301 communicates with the interface 303. The memory 302 in this embodiment of this application may provide a memory for the processor 301. The interface 303 may be a network interface card (NIC), a host bus adapter (HBA), or the like.

In the storage array described in FIG. 2 and FIG. 3, the storage controller 201 may be configured to perform a data index management method in embodiments of this application.

Figure 4:
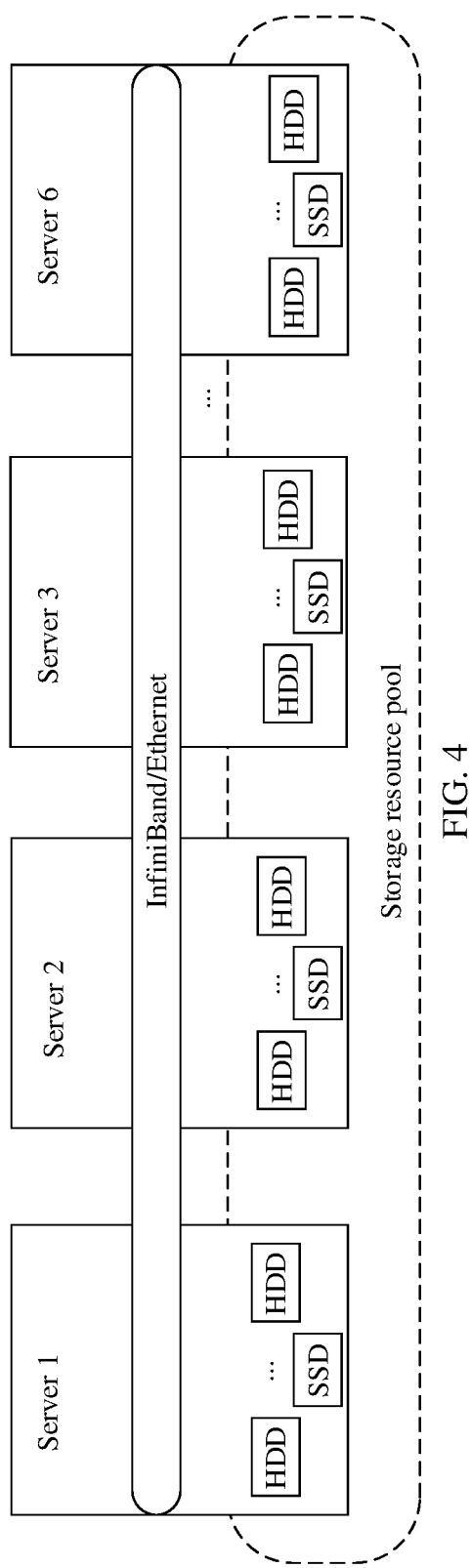
FIG. 4 is an example schematic diagram of another storage system to which an embodiment of this application is applicable.

The storage system in this embodiment of this application may be alternatively a distributed storage system. As shown in FIG. 4, a distributed storage system includes a plurality of servers, such as a server 1, a server 2, a server 3, . . . , and a server 6. The servers communicate with each other over InfiniBand, an Ethernet network, or the like. In actual application, a quantity of servers in the distributed storage system may be increased or decreased based on an actual requirement. This is not limited in this embodiment of this application. The server in the distributed storage system is also referred to as a storage node.

Figure 5:
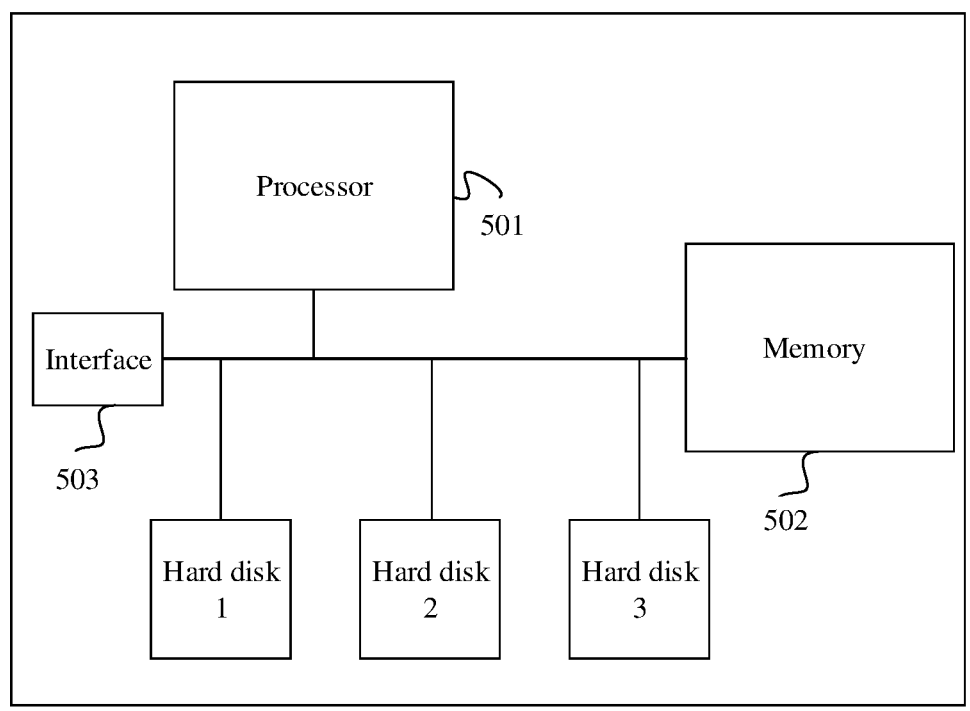
FIG. 5 is an example schematic diagram of a structure of a server to which an embodiment of this application is applicable.

The server in the distributed storage system may include a structure shown in FIG. 5. As shown in FIG. 5, each server in the distributed storage system may include a processor 501, a memory 502, an interface 503, a hard disk 1, a hard disk 2, a hard disk 3, and the like. The memory 502 stores computer program instructions. The processor 501 executes the computer program instructions in the memory 502, to perform a corresponding operation. A CPU, an FPGA, or other hardware may serve as the processor 501, or an FPGA (or other hardware) and a CPU jointly serve as the processor 501. The memory 502 in this embodiment of this application may provide a memory for the processor 501. The interface 503 may be a hardware interface, such as a NIC or an HBA, or may be a program interface module or the like. The hard disk includes an SSD, a magnetic disk, or the like.

In the distributed storage system, the server may be configured to perform the data index management method in embodiments of this application.

The following clearly describes technical solutions in embodiments of this application with reference to the accompanying drawings in embodiments of this application.

Embodiment 1

Figure 6A:
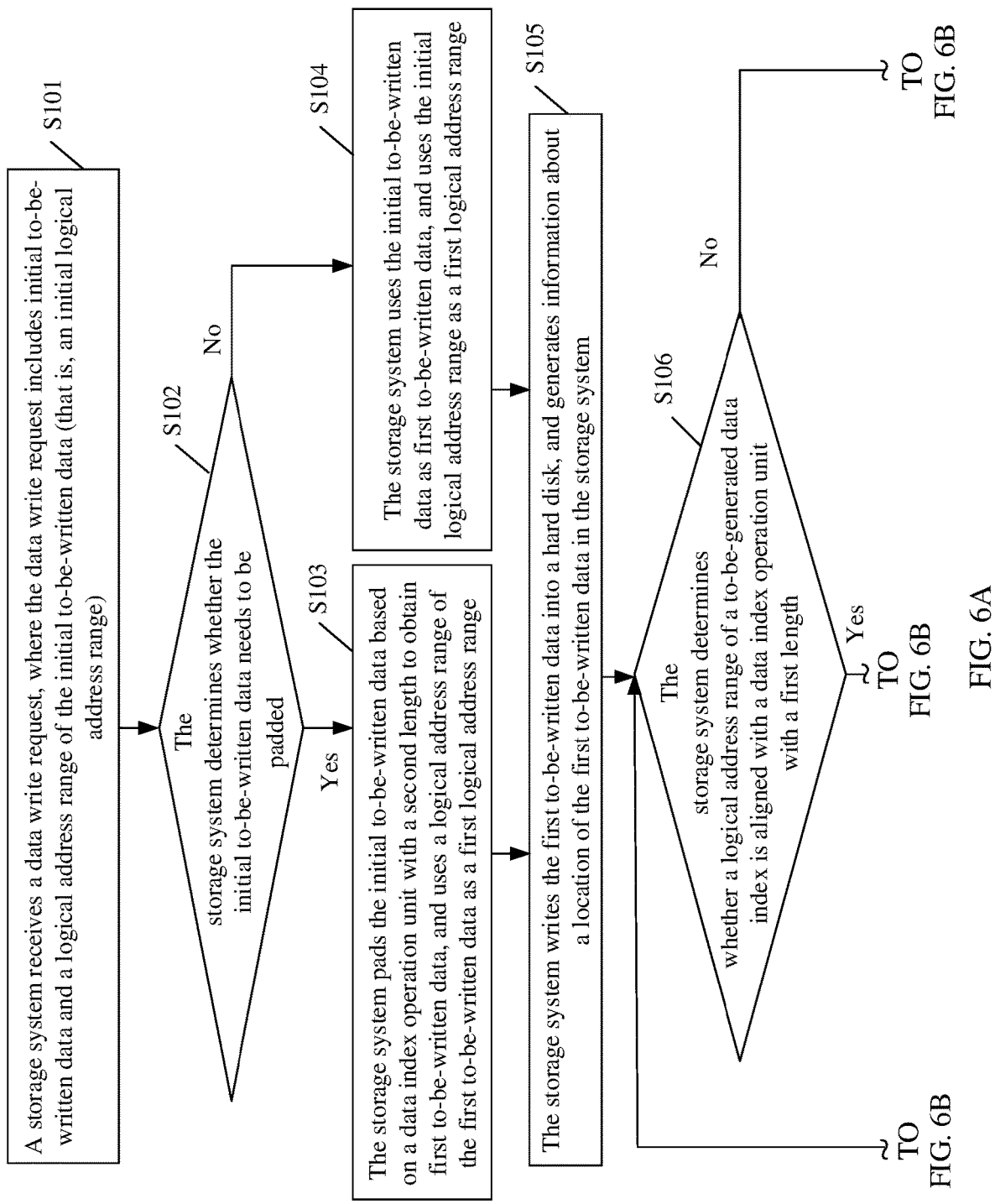
FIG. 6A and FIG. 6B are example schematic flowcharts of a data index management method in a storage system according to an embodiment of this application.
Figure 6B:
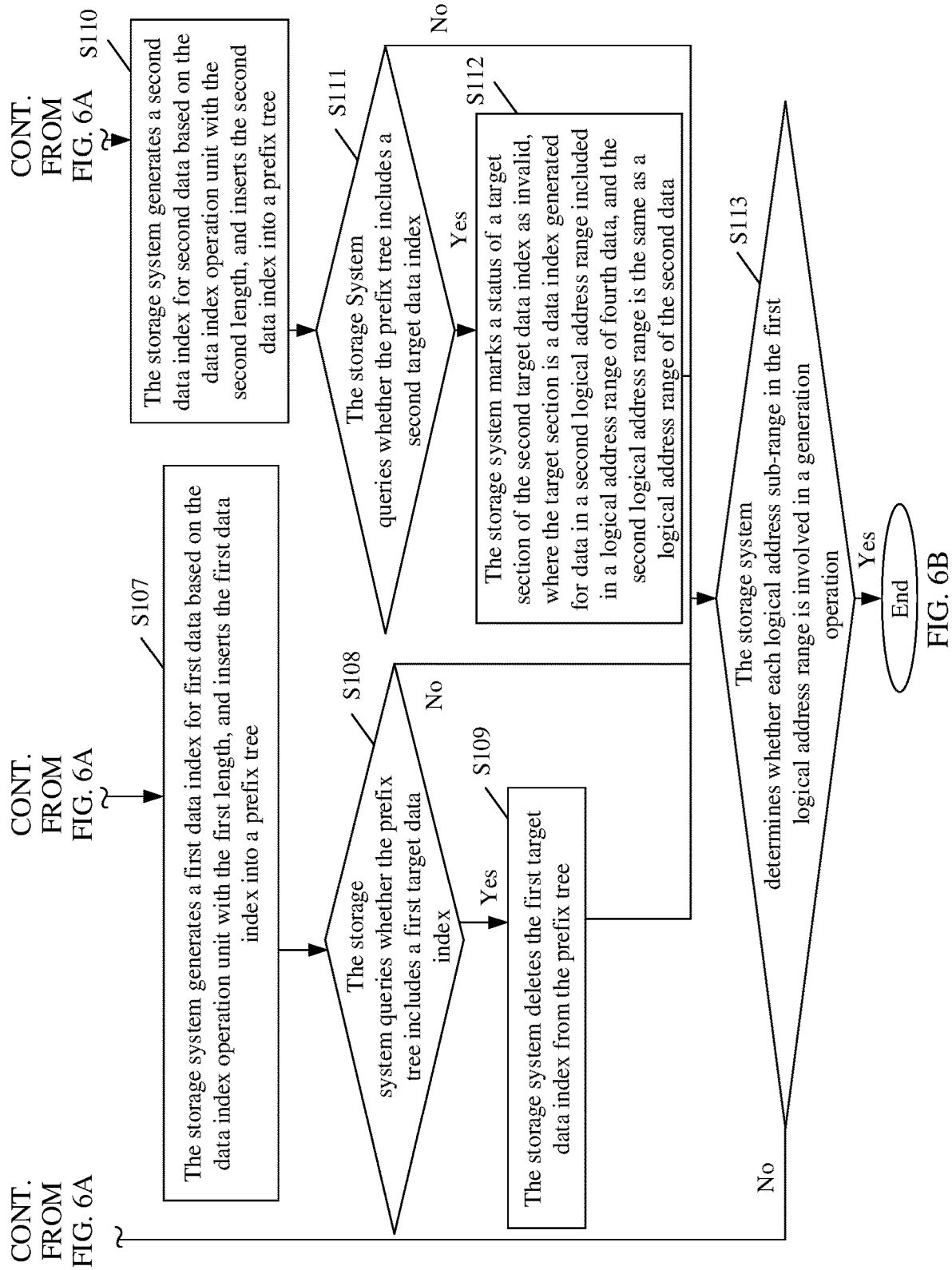

FIG. 6A and FIG. 6B are a schematic flowchart of a data index management method in a storage system according to an embodiment of this application. This embodiment specifically describes the data index management method performed by the storage system "under a trigger condition of a data write request". The method may include the following steps.

S101: The storage system receives a data write request, where the data write request may be a data write request from a client, and the data write request includes initial to-be-written data and a logical address range of the initial to-be-written data (that is, an initial logical address range).

In an example, the initial logical address range may be of any length, and may be specifically determined based on a requirement of the client.

Optionally, the data write request may further include a file name of a file in which the initial to-be-written data is located, a path of the initial to-be-written data in the file in which the initial to-be-written data is located, and the like.

S102: The storage system determines whether the initial to-be-written data needs to be padded; and if the initial to-be-written data needs to be padded, performs S103; or if the initial to-be-written data does not need to be padded, performs S104.

When the $1^{st}$ logical address in the initial logical address range is divisible by a second length, and a length of the initial logical address range is an integer multiple of the second length, the initial to-be-written data does not need to be padded. For example, when the second length is 8 bits, and the initial logical address range is [0 bits, 7 bits], [8 bits, 23 bits], or the like, the initial to-be-written data does not need to be padded.

When the $1^{st}$ logical address in the initial logical address range is not divisible by a second length, and/or a length of the initial logical address range is not an integer multiple of the second length, the initial to-be-written data needs to be padded. For example, the second length is 8 bits. Then, three examples are provided as follows:

Example 1: When the initial logical address range is [1 bit, 7 bits], the $1^{st}$ logical address (that is, 1 bit) in the initial logical address range is not divisible by the second length (that is, 8 bits). In this case, the initial to-be-written data needs to be padded.

Example 2: When the initial logical address range is [0 bits, 6 bits], the length of the initial logical address range (that is, 7 bits) is not an integer multiple of the second length (that is, 8 bits). In this case, the initial to-be-written data needs to be padded.

Example 3: When the initial logical address range is [1 bit, 9 bits], the $1^{st}$ logical address (that is, 1 bit) in the initial logical address range is not divisible by the second length (that is, 8 bits), and the length of the initial logical address range (that is, 9 bits) is not an integer multiple of the second length (that is, 8 bits). In this case, the initial to-be-written data needs to be padded.

S103: The storage system pads the initial to-be-written data based on a data index operation unit with the second length to obtain first to-be-written data, and uses a logical address range of the first to-be-written data as a first logical address range; and performs S105 after performing S103.

Specifically, the padding the initial to-be-written data based on a data index operation unit with the second length may include the following cases.

When the $1^{st}$ logical address in the initial logical address range is not divisible by the second length, the storage system reads, from a hard disk, data in a logical address range with the second length in which the $1^{st}$ logical address is located; and then obtains the first to-be-written data based on the initial to-be-written data and the read data. For example, based on the foregoing example 1, the initial logical address range is [1 bit, 7 bits]. In this case, the storage system may read data in a logical address range [0 bits, 7 bits] from the hard disk, and replace, with the initial to-be-written data, data that is in the logical address range [1 bit, 7 bits] and that belongs to the read data, to obtain the first to-be-written data. In this case, the first to-be-written data includes data whose logical address is [0 bits, 1 bit] and that is read from the hard disk and the initial to-be-written data in the logical address range [1 bit, 7 bits] in the data write request, and the first logical address range is [0 bits, 7 bits].

When the $1^{st}$ logical address in the initial logical address range is divisible by the second length, but the length of the initial logical address range is not an integer multiple of the second length, the storage system reads, from a hard disk, data in a logical address range with the second length in which the last logical address in the initial logical address range is located; and then obtains the first to-be-written data based on the initial to-be-written data and the read data. For example, based on the foregoing example 2, the initial logical address range is [0 bits, 6 bits]. In this case, the storage system may read data in a logical address range [0 bits, 7 bits] from the hard disk, and replace, with the initial to-be-written data, data that is in the logical address range [0 bits, 6 bits] and that belongs to the read data, to obtain the first to-be-written data. In this case, the first to-be-written data includes the initial to-be-written data in the logical address range [0 bits, 6 bits] in the data write request and data whose logical address is [6 bits, 7 bits] and that is read from the hard disk, and the first logical address range is [0 bits, 7 bits].

When the $1^{st}$ logical address in the initial logical address range is not divisible by the second length, and the length of the initial logical address range is not an integer multiple of the second length, the storage system reads, from a hard disk, data in a logical address range with the second length in which the $1^{st}$ logical address in the initial logical address range is located and data in a logical address range with the second length in which the last logical address in the initial logical address range is located; and then obtains the first to-be-written data based on the initial to-be-written data and the read data.

This embodiment of this application supports use of a data index operation unit with a smaller grain to pad the initial to-be-written data, instead of using a data index operation unit with a larger grain to pad the initial to-be-written data. This is conducive to reducing read amplification caused in a data write process, and increasing a rate of reading data from the hard disk in the data write process, thereby improving data write efficiency. The read amplification means that a data volume of data read from the hard disk is greater than a data volume of to-be-written data.

S104: The storage system uses the initial to-be-written data as first to-be-written data, and uses the initial logical address range as a first logical address range; and performs S105 after performing S104.

S105: The storage system stores the first to-be-written data, and records a location of the first to-be-written data in the storage system. When the storage system writes the data into the hard disk, an "append only" mode may be used. Certainly, this is not limited thereto.

The storing, by the storage system, the first to-be-written data includes: allocating a storage location to the first to-be-written data in the storage system, writing the first to-be-written data into the location, and recording the location of the first to-be-written data in the storage system. The location may be a location of the data in the hard disk of the storage system, a location of the data on a volume of the storage system, or the like.

After performing S105, the storage system may perform S106 to S113 one or more times until a data index generation operation is performed based on each logical address sub-range in the first logical address range. The logical address sub-range is a logical address range aligned with a data index operation unit with a first length, or a logical address range aligned with the data index operation unit with the second length.

S106: The storage system determines whether a logical address range of a to-be-generated data index is aligned with the data index operation unit with the first length. When S106 to S113 are performed for the first time, the logical address range of the to-be-generated data index is the first logical address range.

If the logical address range of the to-be-generated data index is aligned with the data index operation unit with the first length, the storage system performs S107; or if the logical address range of the to-be-generated data index is not aligned with the data index operation unit with the first length, the storage system performs S110.

When a length of the $1^{st}$ logical address in the logical address range of the to-be-generated data index is divisible by the first length, and a length of the logical address range of the to-be-generated data index is greater than or equal to the first length, the logical address range of the to-be-generated data index is aligned with the data index operation unit with the first length.

When a length of the $1^{st}$ logical address in the logical address range of the to-be-generated data index is not divisible by the first length, and/or a length of the logical address range of the to-be-generated data index is less than the first length, the logical address range of the to-be-generated data index is not aligned with the data index operation unit with the first length.

For example, the first length is 32 bits. If the first logical address range is [0 bits, 31 bits], when S106 is performed for the first time, the $1^{st}$ logical address in the logical address range of the to-be-generated data index is 0 bits, and the length of the logical address range of the to-be-generated data index is 32 bits. In this case, the foregoing alignment conditions are satisfied, and therefore the logical address range of the to-be-generated data index is aligned with the data index operation unit with the first length. If the first logical address range is [0 bits, 12 bits], when S106 is performed for the first time, the $1^{st}$ logical address in the logical address range of the to-be-generated data index is 0 bits, but the length of the logical address range of the to-be-generated data index is 13 bits. In this case, the foregoing alignment conditions are not satisfied, and therefore the logical address range of the to-be-generated data index is not aligned with the data index operation unit with the first length.

S107: The storage system generates a first data index for first data based on the data index operation unit with the first length.

The first data index includes a first key and a location of the first data in the storage system, for example, an offset of the first data in the hard disk and identification information of a length of the first data (that is, the first length). The first key may include an encoding result of identification information of the file (denoted as a file A below) carried in the data write request and an encoding result of a logical address range of the first data. The location of the first data in the storage system may include data that starts from the $1^{st}$ logical address in the logical address range of the to-be-generated data index and that is in a logical address range whose length is the first length.

It can be understood that a prefix tree generated by the storage system is first stored in a cache. As more data indexes are generated, more nodes are inserted into the prefix tree. When a quantity of nodes in the prefix tree in the cache is greater than or equal to a threshold, the storage system writes the prefix tree into the hard disk. Subsequently, when data is written, the storage system generates a new prefix tree and continues inserting a data index into the prefix tree. In an implementation, S107 further includes inserting the first data index into the prefix tree. The prefix tree described in S107 may be the prefix tree stored in the cache of the storage system. For a specific example in which the storage system inserts a data index into a prefix tree, refer to FIG. 7 below.

Optionally, S107 may include: The storage system encodes the logical address range of the first data based on the data index operation unit with the first length, to obtain the encoding result of the logical address range of the first data. For example, "a" is used as the encoding result of the logical address range of the first data. "a" indicates that the logical address range of the first data is the $a^{th}$ logical address range with the first length in the file A, and a is an integer. Alternatively, "ax" is used as the encoding result of the logical address range of the first data. For a meaning of "a", reference is made to the foregoing description; and x may be a preset string.

For example, if the first length is 32 bits, the second length is 8 bits, and the logical address range of the first data is [32 bits, 63 bits], the encoding result of [32 bits, 63 bits] may be "1ff". Specifically, a modulo operation may be performed between the $1^{st}$ logical address, that is, the $32^{nd}$ bit, in the logical address range and the first length: "32 bits mod 32 bits=1", and a preset string x is specifically "ff".

S108: The storage system queries whether a first target data index is included. The first target data index is a data index generated for third data based on the data index operation unit with the second length, the logical address range of the first data includes a logical address range of the third data, and the first target data index includes a location of the third data in the storage system.

For example, assuming that the first length is 32 bits, the second length is 8 bits, and the first data is data in a logical address range [0 bits, 31 bits], the first target data index may be a data index generated by the storage system based on a logical address range [0 bits, 7 bits], [8 bits, 15 bits], [16 bits, 23 bits], or [24 bits, 31 bits].

Based on the query result in step S108, if no first target data index is included, it indicates that the storage system writes data in "a logical address range (that is, the logical address range of the third data) corresponding to the first target data index" for the first time, and S113 is performed. For an example in this case, refer to FIG. 7.

Based on the query result in step S108, if the first target data index is included, it indicates that the storage system writes data in "a logical address range (that is, the logical address range of the third data) corresponding to the first target data index" not for the first time, and S109 is performed. For an example in this case, refer to FIG. 8.

In the data index implemented based on the prefix tree, S108 is specifically as follows: The storage system queries whether the prefix tree includes the first target data index.

S109: The storage system deletes the first target data index, and performs S113.

For "the logical address range corresponding to the first target data index", the third data is new data, and data indicated by the first target data index is old data. Deleting the data index of the old data is conducive to reducing storage space occupied by the data indexes, and improving garbage collection efficiency during garbage collection. In the data index implemented based on the prefix tree, S109 is specifically as follows: The storage system deletes the first target data index from the prefix tree.

For a specific example in which the storage system deletes the existing data index from the prefix tree, refer to FIG. 8 below.

In another implementation, the storage system marks the first target data index as invalid.

S110: The storage system generates a second data index for second data based on the data index operation unit with the second length. The second data index includes a second key and a location of the second data in the storage system. The second key may include an encoding result of identification information of the file (denoted as a file A below) carried in the data write request and an encoding result of a logical address range of the second data. The second data is data, in the first to-be-written data, that starts from the $1^{st}$ logical address in the logical address range of the to-be-generated data index and that is in a logical address range whose length is the second length. In the data index implemented based on the prefix tree, S110 further includes inserting the second data index into the prefix tree.

For example, the location of the second data in the storage system may include: an offset of the second data in the hard disk and identification information of a length of the second data (that is, the second length).

In this embodiment of the present invention, the data index is generated preferentially based on the data index operation unit with the first length, and when the logical address range of the to-be-generated data index is not aligned with the data index operation unit with the first length, the data index is created based on the data index operation unit with the second length.

Optionally, S110 may include: The storage system encodes the logical address range of the second data based on the data index operation unit with the second length, to obtain the encoding result of the logical address range of the second data. For example, "ab" is used as the encoding result of the logical address range of the second data. "ab" indicates that the logical address range of the second data is the b$^{th}$ logical address range with the second length in the a$^{th}$ logical address range with the first length in the file A, and both a and b are integers.

For example, if the first length is 32 bits, the second length is 8 bits, and the logical address range of the second data is [8 bits, 15 bits], the encoding result of [8 bits, 15 bits] may be "01", which is used to indicate that [8 bits, 15 bits] is the 1$^{st}$ logical address range with the second length in the 0$^{th}$ logical address range with the first length in the file A. The encoding result "01" may be obtained by performing a modulo operation between the 1$^{st}$ logical address, that is, the eighth bit, in the logical address range and the first length and between the eighth bit and the second length (that is, 8 bits mod 32 bits=0 and 8 bits mod 8 bits=1).

S111: The storage system queries whether a second target data index is included. The second target data index is a data index generated for fourth data based on the data index operation unit with the first length, a logical address range of the fourth data includes the logical address range of the second data, and the second target data index includes a location of the fourth data in the storage system.

In the data index implemented based on the prefix tree, S111 is specifically as follows: The storage system queries whether the prefix tree includes the second target data index.

For example, assuming that the first length is 32 bits, the second length is 8 bits, and the second data is data in the logical address range [8 bits, 15 bits], the second target data index may be a data index generated by the storage system based on the logical address range whose length is the first length (that is, the logical address range [0 bits, 31 bits]) in which the data in [8 bits, 15 bits] is located.

The storage system queries whether the prefix tree includes the second target data index. If no second target data index is included, it indicates that the storage system writes data in "a logical address range corresponding to the second target data index" for the first time, and S113 is performed. For an example in this case, refer to FIG. 7.

The storage system queries whether the prefix tree includes the second target data index. If the second target data index is included, it indicates that the storage system writes data in "a logical address range corresponding to the second target data index" not for the first time, and S112 is performed. For an example in this case, refer to FIG. 9.

Optionally, the second target data index may include a plurality of sections (Section), a status of each section may be marked as valid or invalid, and one section is corresponding to one logical address range that is in "the logical address range corresponding to the second target data index" and that is aligned with the data index operation unit with the second length. How to mark a status of each section as invalid or not (or mark a status of each section as valid or not) is not limited in this embodiment of this application. Optionally, a status bit included in the second target data index may be in a bitmap manner. In an example, one status bit may be one bit.

For example, assuming that the first length is 32 bits, the second length is 8 bits, and the logical address range corresponding to the second target data index is [0 bits, 31 bits], the second target data index may include four status bits. The four status bits are respectively corresponding to the logical address ranges [0 bits, 7 bits], [8 bits, 15 bits], [16 bits, 23 bits], and [24 bits, 31 bits], and are respectively used to indicate whether data that is in the logical address ranges [0 bits, 7 bits], [8 bits, 15 bits], [16 bits, 23 bits], and [24 bits, 31 bits] and that belongs to data indicated by the second target data index is valid.

In an implementation, after generating the second target data index, the storage system may generate statuses of the plurality of sections, and mark the statuses of the plurality of sections as valid; and when a status of one or some sections in the plurality of statuses needs to be marked as invalid, mark the status of the one or more sections as invalid.

In another implementation, when a status of one or some sections of the second target data index needs to be marked as invalid, the storage system may generate statuses of the plurality of sections, and mark the status of the one or some sections as invalid. This is conducive to reducing occupied storage resources.

S112: The storage system marks a status of a target section of the second target data index as invalid, where the target section is a data index generated for data in a second logical address range included in the logical address range of the fourth data, and the second logical address range is the same as the logical address range of the second data.

For "the logical address range of the second data (referred to as a logical address range B)", the second data is new data, and data in the logical address range B in the logical address range corresponding to the second target data index is old data. Performing S111 and S112 is conducive to distinguishing between new data and old data in a data query process and a garbage collection process, thereby improving data query efficiency and garbage collection efficiency.

Optionally, when all statuses of the second target data index are marked as invalid, it indicates that all data indicated by the second target data index is invalid data. Therefore, the second target data index can be deleted, to reduce the storage space occupied by the data indexes.

S113: The storage system determines whether each logical address sub-range in the first logical address range is involved in the generation operation.

If each logical address sub-range in the first logical address range is involved in the generation operation, the operation procedure of the current data write request ends. If not all logical address sub-ranges in the first logical address range are involved in the generation operation, S106 is performed again.

According to the data index management method in the storage system provided in this embodiment of this application, a data index can be managed based on data index operation units with different lengths, and data index operation units with different lengths may be selected based on a logical address range carried in a data write operation, to generate data indexes. When it is ensured that a same logical address range is aligned with a corresponding data index operation unit, generating a data index based on a data index operation unit with a larger length leads to a smaller quantity of data indexes, thereby reducing storage space occupied by the data indexes. Therefore, using the technical solution provided in this embodiment of this application is conducive to reducing the storage space occupied by the data indexes.

The following describes a prefix tree insertion process and a prefix tree modification process to describe the data index management method in the storage system described above.

Embodiment I

Figure 7:
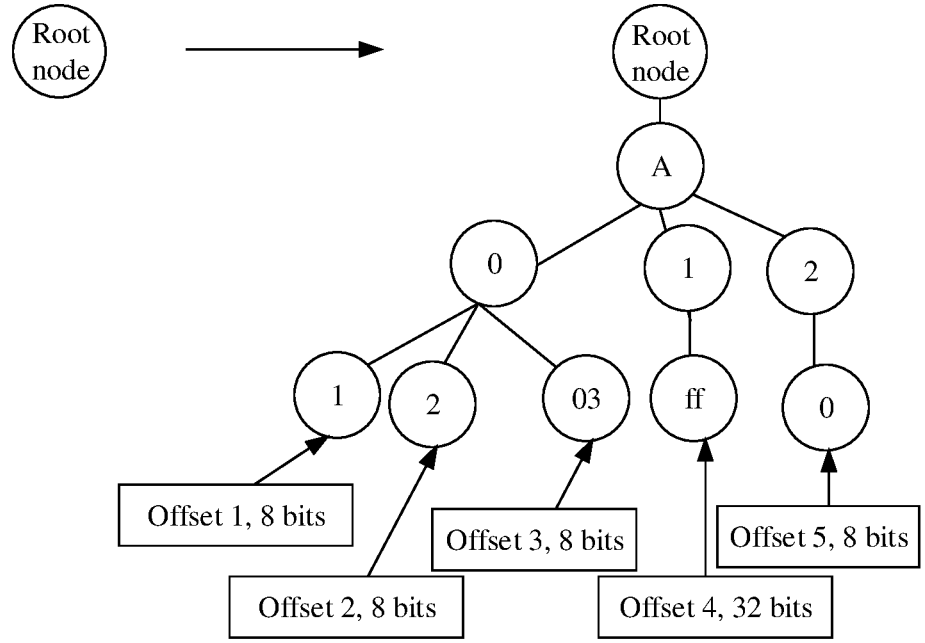
FIG. 7 is an example schematic diagram of a prefix tree insertion process according to an embodiment of this application.

FIG. 7 is a schematic diagram of a prefix tree insertion process according to this embodiment. In this embodiment, the data write request includes a file name "A" of the file A, the first to-be-written data, and a first logical address range [8 bits, 71 bits], and the storage system writes data in the first logical address range for the first time. The first length is 32 bits and the second length is 8 bits.

A diagram a in FIG. 7 shows a plurality of logical address sub-ranges into which the first logical address range is divided. One logical address sub-range represents a logical address range involved in a generation operation when S106 to S113 are performed once.

A diagram b in FIG. 7 shows a location of data in each logical address sub-range in the storage system, where the location includes an offset and a data length. Offsets corresponding to the logical address sub-ranges are denoted as offsets 1 to 5.

A diagram c in FIG. 7 shows the prefix tree before and after the data write request is executed. Before the data write request is executed, there is no data index in the prefix tree, and there is only one root node. After the data write request is executed, there are data indexes 1 to 5 in the prefix tree.

A detailed analysis process is as follows:

When S106 to S113 are performed for the first time, the logical address range of the to-be-generated data index is [8 bits, 71 bits], and cannot be aligned with the data index operation unit with the first length. In this case, the storage system generates a data index 1 based on the data index operation unit with the second length. When S106 to S113 are performed this time, a logical address range involved in a generation operation is [8 bits, 15 bits]. A key in the data index 1 may be "A01", indicating that [8 bits, 15 bits] is the $1^{st}$ logical address range with the second length in the $0^{th}$ logical address range with the first length in the file A. A location in the data index 1 may be "an offset 1, 8 bits".

When S106 to S113 are performed for the second time, the logical address range of the to-be-generated data index is [16 bits, 71 bits], and cannot be aligned with the data index operation unit with the first length. In this case, the storage system generates a data index 2 based on the data index operation unit with the second length. When S106 to S113 are performed this time, a logical address range involved in the generation operation is [16 bits, 23 bits]. A key in the data index 2 may be "A02". A location in the data index 2 may be "an offset 2, 8 bits".

When S106 to S113 are performed for the third time, the logical address range of the to-be-generated data index is [24 bits, 71 bits], and cannot be aligned with the data index operation unit with the first length. In this case, the storage system generates a data index 3 based on the data index operation unit with the second length. When S106 to S113 are performed this time, a logical address range involved in the generation operation is [24 bits, 31 bits]. A key in the data index 3 may be "A03". A location in the data index 3 may be "an offset 3, 8 bits".

When S106 to S113 are performed for the fourth time, the logical address range of the to-be-generated data index is [32 bits, 71 bits], and can be aligned with the data index operation unit with the first length. In this case, the storage system generates a data index 4 based on the data index operation unit with the first length. When S106 to S113 are performed this time, a logical address range involved in the generation operation is [32 bits, 63 bits]. A key in the data index 4 may be "A1ff", indicating that [32 bits, 63 bits] is the $1^{st}$ logical address range with the first length in the file A, and "ff" is a preset string. A location in the data index 4 may be "an offset 4, 32 bits".

When S106 to S113 are performed for the fifth time, the logical address range of the to-be-generated data index is [64 bits, 71 bits], and cannot be aligned with the data index operation unit with the first length. In this case, the storage system generates a data index 5 based on the data index operation unit with the second length. When S106 to S113 are performed this time, a logical address range involved in the generation operation is [64 bits, 71 bits]. A key in the data index 5 may be "A20". A location in the data index 5 may be "an offset 5, 8 bits".

By now, each logical address sub-range in the first logical address range has been involved in the generation operation.

When it is ensured that a same logical address range is aligned with a corresponding data index operation unit, generating a data index based on a data index operation unit with a larger grain leads to a smaller quantity of data indexes, thereby reducing storage space occupied by the data indexes. For example, if the data indexes are generated based on the data index operation unit with the second length, for the data index 4, four data indexes need to be generated. It can be learned that the technical solution provided in this embodiment of this application is conducive to reducing the storage space occupied by the data indexes.

Embodiment II

This embodiment describes a prefix tree modification procedure. In this embodiment, the first length is 32 bits and the second length is 8 bits.

Figure 8:
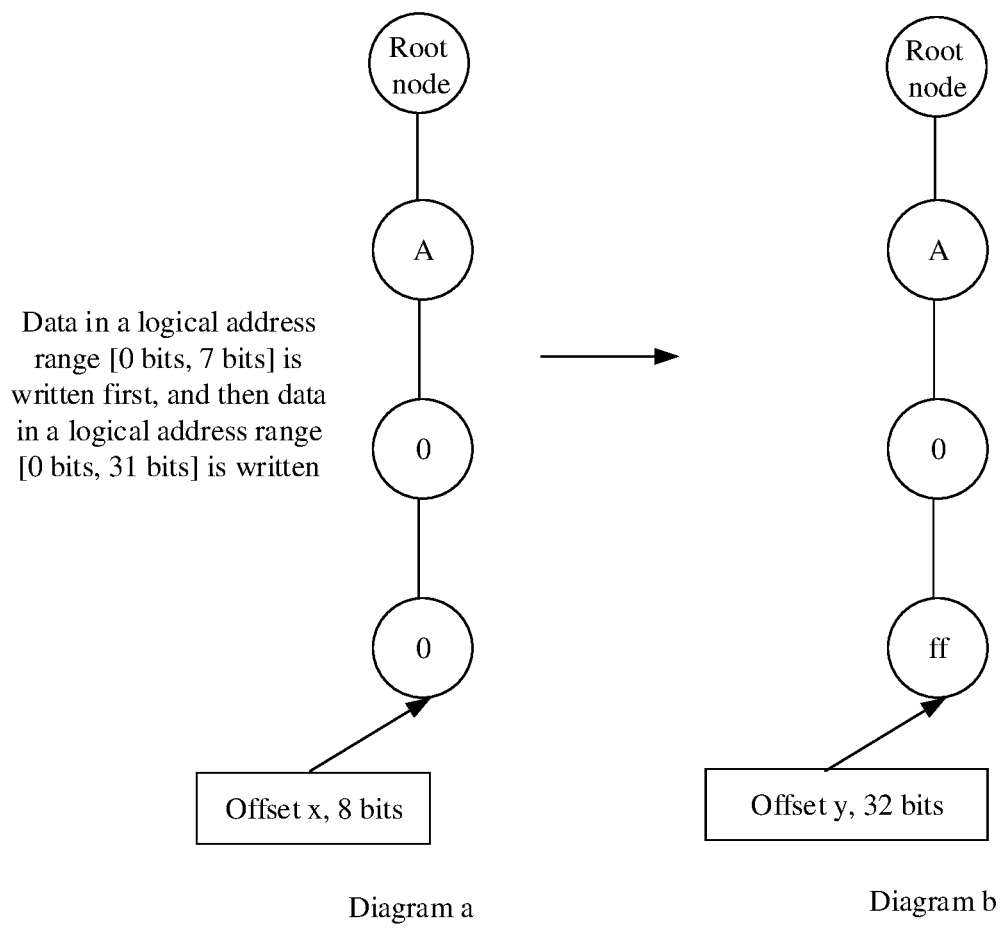
FIG. 8 is an example schematic diagram of a prefix tree modification process according to an embodiment of this application.

FIG. 8 is a schematic diagram of a prefix tree modification procedure according to an embodiment of this application. In this example, data in "the logical address range [0 bits, 7 bits] in the file A" is written first, and then data in "the logical address range [0 bits, 31 bits] in the file A" is written. Details are as follows:

After the data in the logical address range [0 bits, 7 bits] is written, a key in a data index generated by the storage system may be "A00", and a location may be "an offset x, 8 bits", as shown in a diagram a in FIG. 8.

After the data in the logical address range [0 bits, 31 bits] is written, a key in a data index generated by the storage system may be "A0ff", and a location may be "an offset y, 32 bits". The storage system may first insert the data index into the prefix tree. Next, because the prefix tree includes the first target data index (that is, the data index shown in the diagram a in FIG. 8), the storage system may delete the first target data index, to obtain a prefix tree shown in a diagram b in FIG. 8.

Figure 9:
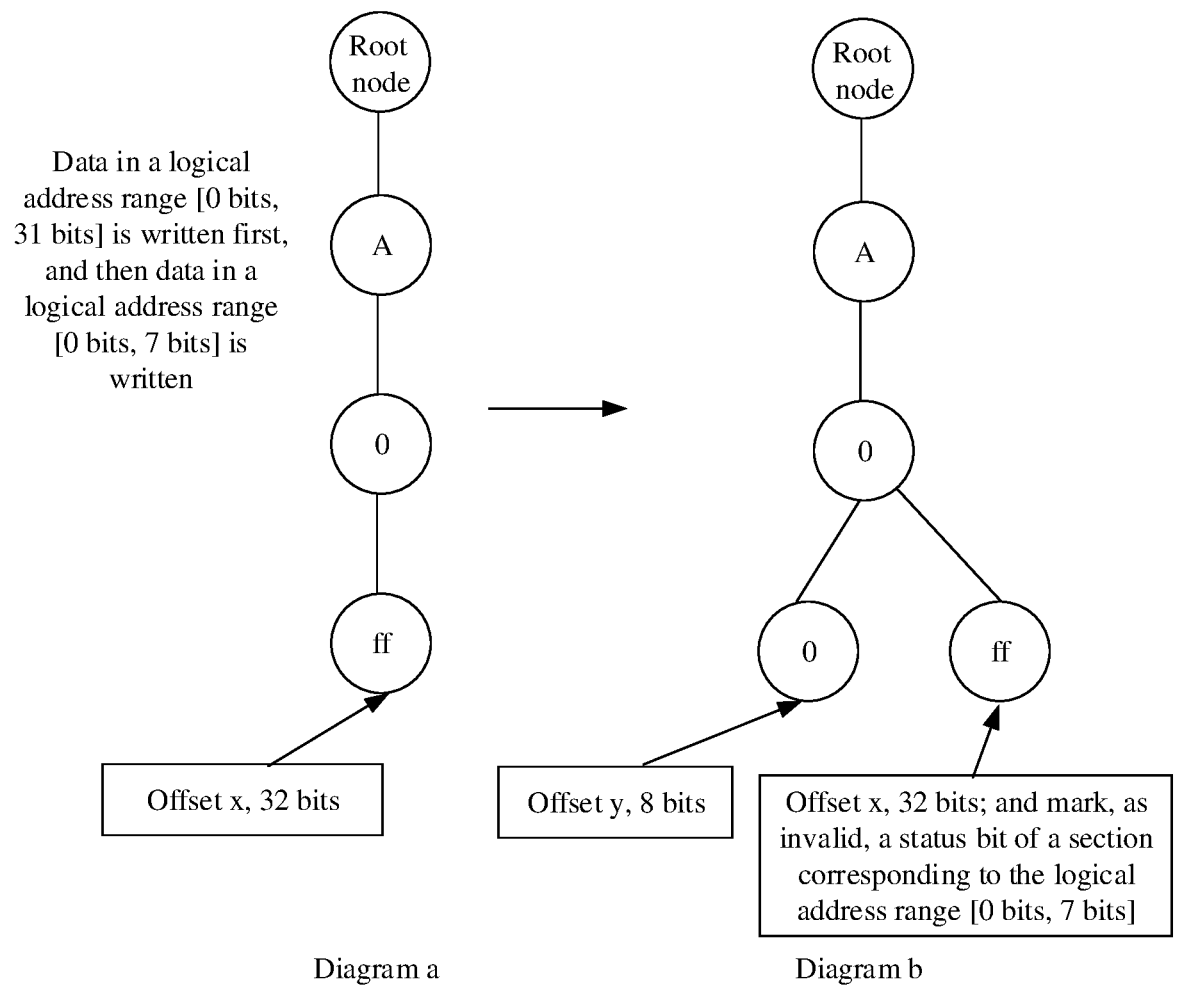
FIG. 9 is an example schematic diagram of another prefix tree modification process according to an embodiment of this application.

FIG. 9 is a schematic diagram of another prefix tree modification procedure according to an embodiment of this application. In this example, data in "the logical address range [0 bits, 31 bits] in the file A" is written first, and then data in "the logical address range [0 bits, 7 bits] in the file A" is written. Details are as follows:

After the data in the logical address range [0 bits, 31 bits] is written, a key in a data index 1 generated by the storage system may be "A0ff", and a location may be "an offset x, 32 bits", as shown in a diagram a in FIG. 9.

After the data in the logical address range [0 bits, 7 bits] is written, a key in a data index 2 generated by the storage system may be "A00", and a location may be "an offset y, 8 bits". The storage system may first insert the data index 2 into the prefix tree. Next, because the prefix tree includes the second target data index (that is, the data index shown in the diagram a in FIG. 9), the storage system may set statuses of a plurality of sections of the data index shown in the diagram a in FIG. 9, and mark, as invalid, a status of a section that is in the plurality of sections and that is corresponding to the logical address range [0 bits, 7 bits], to obtain a prefix tree shown in a diagram b in FIG. 9.

Embodiment 2

Figure 10A:
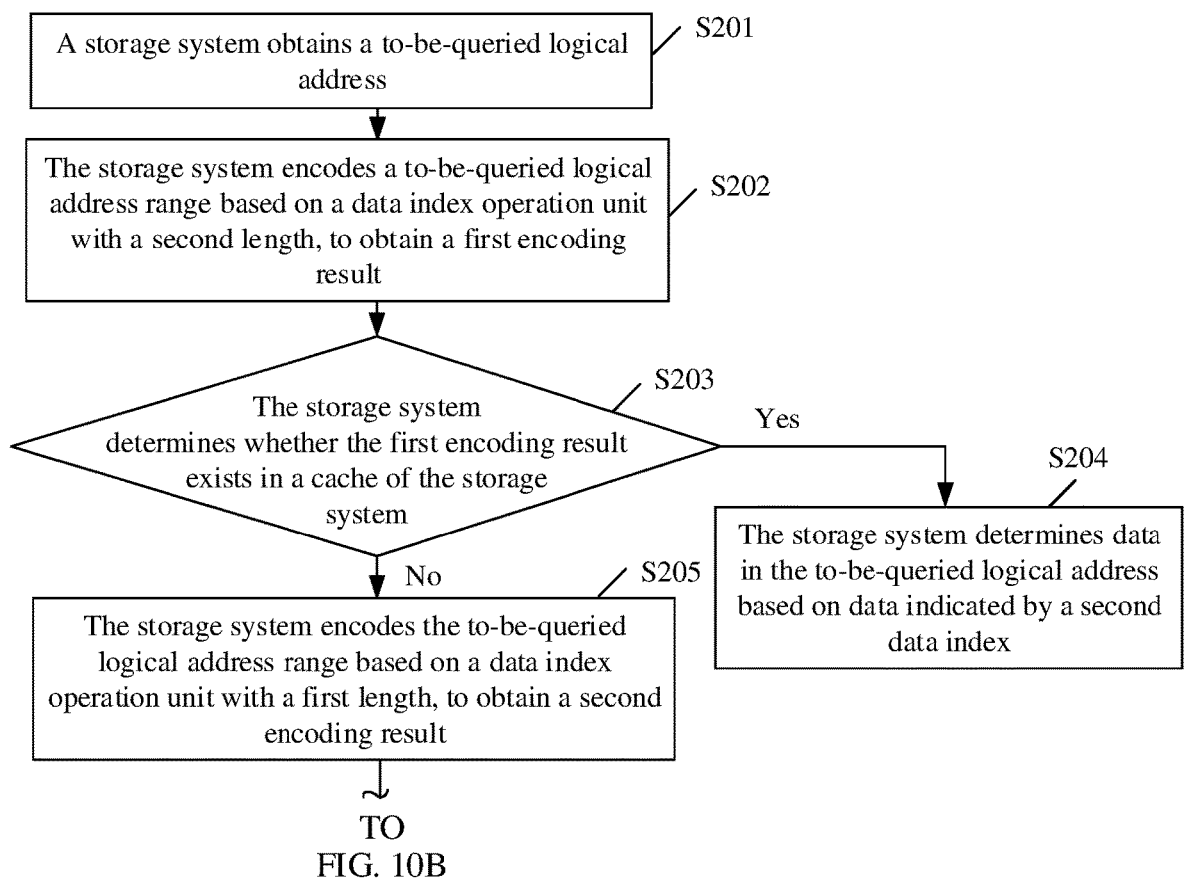
FIG. 10A and FIG. 10B are example schematic flowcharts of another data index management method in a storage system according to an embodiment of this application.
Figure 10B:
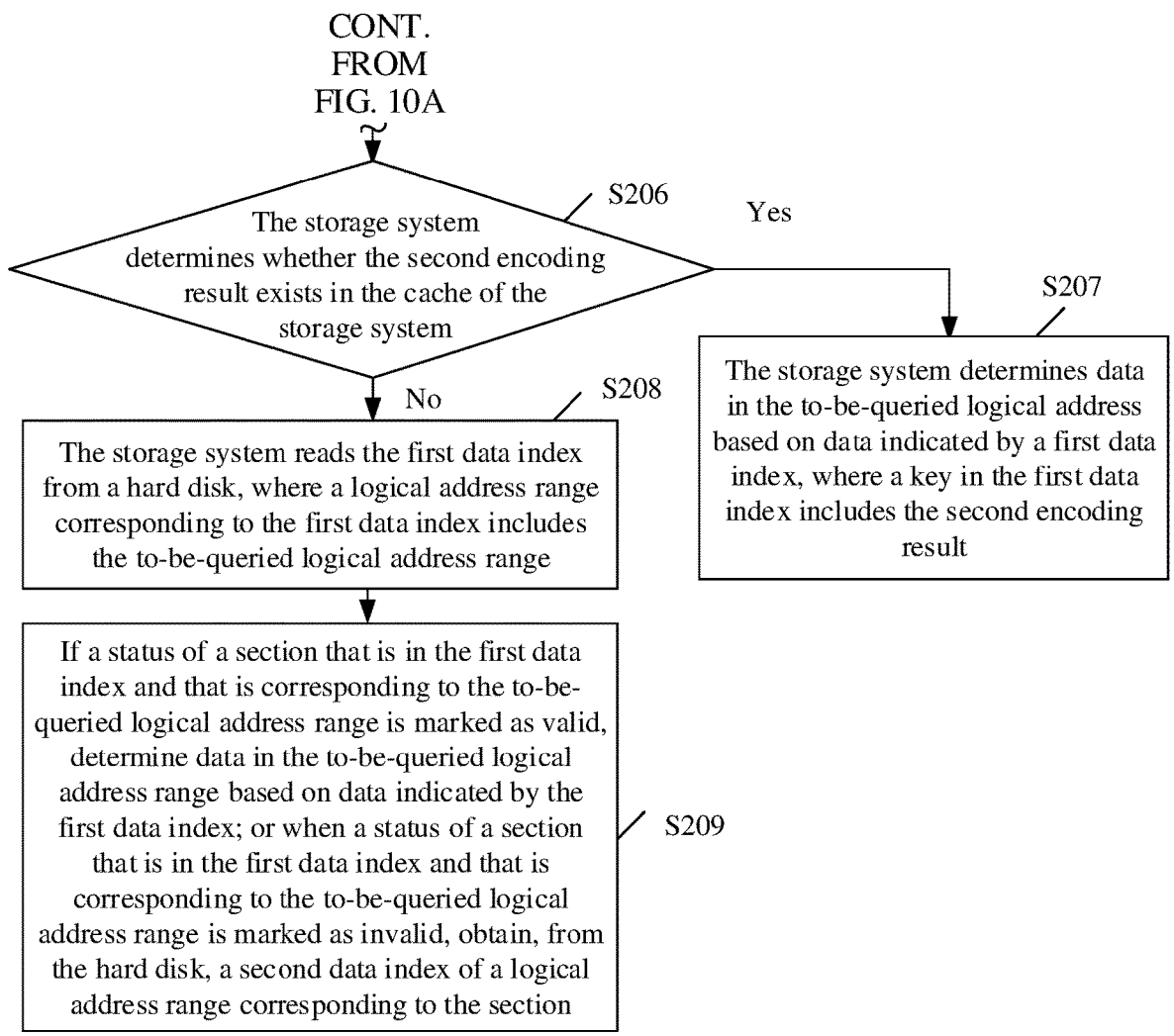

FIG. 10A and FIG. 10B are a schematic flowchart of a data index management method in a storage system according to an embodiment of this application. This embodiment specifically describes the data index management method performed in a data query process. The method may include the following steps.

S201: The storage system obtains a to-be-queried logical address range. The to-be-queried logical address range is aligned with a data index operation unit with a first length or aligned with a data index operation unit with a second length. In other words, the to-be-queried logical address range in this embodiment may be the logical address sub-range described above.

The to-be-queried logical address range being aligned with the data index operation unit with the first length may include: A length of the $1^{st}$ logical address in the to-be-queried logical address range is divisible by the first length, and a length of the to-be-queried logical address range is the same as the first length.

The to-be-queried logical address range being aligned with the data index operation unit with the second length may include: The $1^{st}$ logical address in the to-be-queried logical address range is divisible by the second length, and a length of the to-be-queried logical address range is the same as the second length.

S201 may be extended as follows: The storage system receives a data query request, and determines the to-be-queried logical address range based on a logical address range carried in the data query request. A specific implementation in which the storage system determines the to-be-queried logical address range is not limited in this embodiment of this application. For example, for the specific implementation, refer to the foregoing related description of obtaining a logical address sub-range.

S202: The storage system encodes the to-be-queried logical address range based on the data index operation unit with the second length, to obtain a first encoding result.

For example, assuming that the to-be-queried logical address range is [0 bits, 7 bits], the storage system may encode [0 bits, 7 bits] based on the data index operation unit with the second length, to obtain the first encoding result "00".

S203: The storage system determines whether the first encoding result exists in a cache of the storage system. For example, the storage system queries whether a key of a prefix tree includes the first encoding result. If the first encoding result exists in the cache of the storage system, the storage system performs S204; or if the first encoding result does not exist in the cache of the storage system, the storage system performs S205.

Example 1: Based on the example in S202, assuming that the prefix tree is shown in the diagram b in FIG. 9, the storage system may obtain, through query, a data index (that is, the data index 1) that includes "a key including 00" in the prefix tree, that is, hit.

Example 2: Based on the example in S202, assuming that the prefix tree is shown in the diagram b in FIG. 8, the storage system may obtain, through query, a data index that does not include "a key including 00" in the prefix tree, that is, not hit.

S204: The storage system determines data in the to-be-queried logical address range based on data indicated by a second data index. A key in the second data index includes the first encoding result. After S204 is performed, the current query process ends.

Based on the example 1 in S203, the storage system may use data indicated by the data index 1 as the data in the to-be-queried logical address range. In this example, the data indicated by the data index 1 is the data in the to-be-queried logical address range.

S205: The storage system encodes the to-be-queried logical address range based on the data index operation unit with the first length, to obtain a second encoding result.

S206: The storage system determines whether the second encoding result exists in the cache of the storage system. For example, the storage system queries whether the key of the prefix tree includes the second encoding result. If the second encoding result exists in the cache of the storage system, the storage system performs S207; or if the second encoding result does not exist in the cache of the storage system, it indicates that the data in the to-be-queried logical address range does not exist in the cache of the storage system, and the storage system performs S208.

For example, based on the example 2 in S203, the storage system may encode [0 bits, 7 bits] based on the data index operation unit with the first length, to obtain the second encoding result "0ff".

S207: The storage system determines data in the to-be-queried logical address range based on data indicated by a first data index, where a key in the first data index includes the second encoding result. After S207 is performed, the current query process ends.

For example, based on the example in S206, the storage system may use, as data requested by the data query request, the data that is in the to-be-queried logical address range and that belongs to data indicated by the data index whose key includes "00" in the diagram b in FIG. 9.

In another example, when S207 is performed, the storage system may obtain the data in the to-be-queried logical address range based on the first data index and a second data index. For example, based on the prefix tree shown in the diagram b in FIG. 9, assuming that the to-be-queried logical address range is [0 bits, 31 bits], both the first encoding result and the second encoding result are hit. In this case, the data in the to-be-queried logical address range may include: the data indicated by the second data index, that is, the data in the logical address range [0 bits, 7 bits]; and data that is in a logical address range [8 bits, 31 bits] and that belongs to some data indicated by the first data index.

In S201 to S207, after the to-be-queried logical address range is encoded based on data index operation units with a plurality of grains, if both the encoding results are hit, it indicates that data in a logical address range that is the to-be-queried logical address range and that is indicated by the data index generated based on the data index operation unit with a smaller grain is new data, whereas data in a logical address range that is the to-be-queried logical address range and that is indicated by the data index generated based on the data index operation unit with a larger grain is old data. For a specific example, refer to the foregoing analysis of the example shown in FIG. 9. In this case, the data in the to-be-queried logical address range is determined preferentially based on the encoding result obtained based on the data index operation unit with a smaller grain. This is conducive to ensuring that the found data is new data. In other words, in a query procedure, the data index operation unit with a smaller grain has a higher priority.

S208: The storage system reads a first data index from a hard disk, where a logical address range corresponding to the first data index includes the to-be-queried logical address range.

S209: If a status of a section that is in the first data index and that is corresponding to the to-be-queried logical address range is marked as valid, determine data in the to-be-queried logical address range based on data indicated by the first data index; or when a status of a section that is in the first data index and that is corresponding to the to-be-queried logical address range is marked as invalid, obtain, from the hard disk, a second data index of a logical address range corresponding to the section.

For example, assuming that the to-be-queried logical address range is [0 bits, 7 bits], the storage system may first read, from the hard disk, the first data index corresponding to the logical address range (that is, [0 bits, 31 bits]) in which [0 bits, 7 bits] is located and that is corresponding to the data index operation unit with the first length. If the status of the section that is in the first data index and that is corresponding to [0 bits, 7 bits] is marked as invalid, the second data index corresponding to the logical address range [0 bits, 7 bits] is obtained from the hard disk.

S208 and S209 describe a solution that is for querying a data index from the hard disk and that is provided in this embodiment of this application. In this solution, the data is read from the cache preferentially based on the data index operation unit with a larger grain. This is conducive to reducing a quantity of times of reading data from the hard disk. Because a rate of reading data from the hard disk is relatively low, performing S208 and S209 is conducive to increasing a data read rate.

Embodiment 3

A storage system may combine a plurality of prefix trees stored in a hard disk. This embodiment describes a prefix tree combination procedure.

A principle followed by prefix tree combination is similar to principles followed by the prefix tree insertion process and the prefix tree modification process that are described above. A difference lies in that the prefix tree insertion process and the prefix tree modification process that are described above are intended for updating one prefix tree, whereas this embodiment mainly describes a combination of a plurality of prefix trees. The following uses an example for detailed description in which a first prefix tree and a second prefix tree are combined.

For root nodes in the first prefix tree and the second prefix tree, the storage system combines the root nodes in the first prefix tree and the second prefix tree into one root node.

For an intermediate node in one of the first prefix tree and the second prefix tree, if an intermediate node identical to the intermediate node is found in the other prefix tree, the storage system combines the two intermediate nodes into one intermediate node. Otherwise, the storage system retains the intermediate node in a combined prefix tree. It is assumed that the first prefix tree includes a first intermediate node and the second prefix tree includes a second intermediate node. If the root node in the first prefix tree (denoted as a first root node) is identical to the root node in the second prefix tree (denoted as a second root node), and a path from the first root node to the first intermediate node is identical to a path from the second root node to the second intermediate node, it is considered that the first intermediate node is identical to the second intermediate node.

For any leaf node (that is, for any data index) in the first prefix tree and the second prefix tree, if no data index whose logical address range overlaps a logical address range corresponding to any leaf node is found in the other prefix tree, the storage system retains the leaf node in the combined prefix tree. If a data index whose logical address range overlaps a logical address range corresponding to any leaf node is found in the other prefix tree, prefix trees are combined based on one or more of the following scenarios 1 to 3.

Scenario 1: It is assumed that generation time of the first prefix tree is earlier than that of the second prefix tree, the first prefix tree includes a first data index, and the first data index is generated based on a data index operation unit with a first length. The second prefix tree includes a second data index, and the second data index is generated based on a data index operation unit with a second length. A logical address range corresponding to the first data index includes a logical address range corresponding to the second data index. In this case, the combined prefix tree includes the first data index and the second data index, the first data index includes statuses of a plurality of sections, and a status of a section that is in the plurality of sections and that is corresponding to "the logical address range corresponding to the second data index" is marked as invalid.

Figure 11:
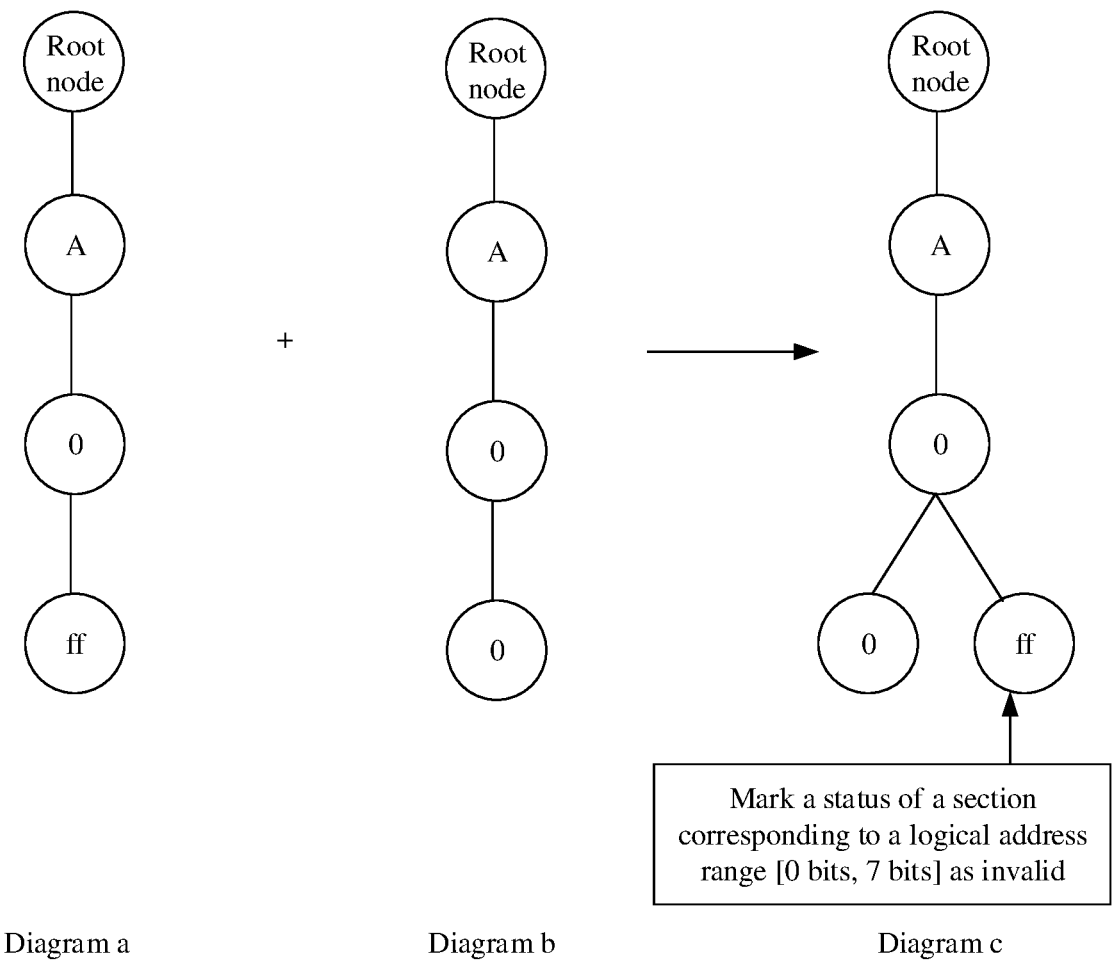
FIG. 11 is an example schematic diagram of a prefix tree combination process according to an embodiment of this application.

For example, FIG. 11 is a schematic diagram of a prefix tree combination process in this scenario.

A diagram a in FIG. 11 illustrates the first prefix tree. The first prefix tree includes the first data index, the logical address range corresponding to the first data index is [0 bits, 31 bits], and a key in the first data index is "A0ff".

A diagram b in FIG. 11 illustrates the second prefix tree. The second prefix tree includes the second data index, the logical address range corresponding to the second data index is [0 bits, 7 bits], and a key in the second data index is "A00".

A diagram c in FIG. 11 illustrates the combined prefix tree. The combined prefix tree includes the first data index and the second data index, the first data index includes the statuses of the plurality of sections, and a status of a section corresponding to [0 bits, 7 bits] is marked as invalid.

Scenario 2: It is assumed that generation time of the first prefix tree is earlier than that of the second prefix tree, the first prefix tree includes a second data index, and the second data index is generated based on a data index operation unit with a second length. The second prefix tree includes a first data index, and the first data index is generated based on a data index operation unit with a first length. A logical address range corresponding to the first data index includes a logical address range corresponding to the second data index. In this case, the combined prefix tree includes the first data index but does not include the second data index.

Figure 12:
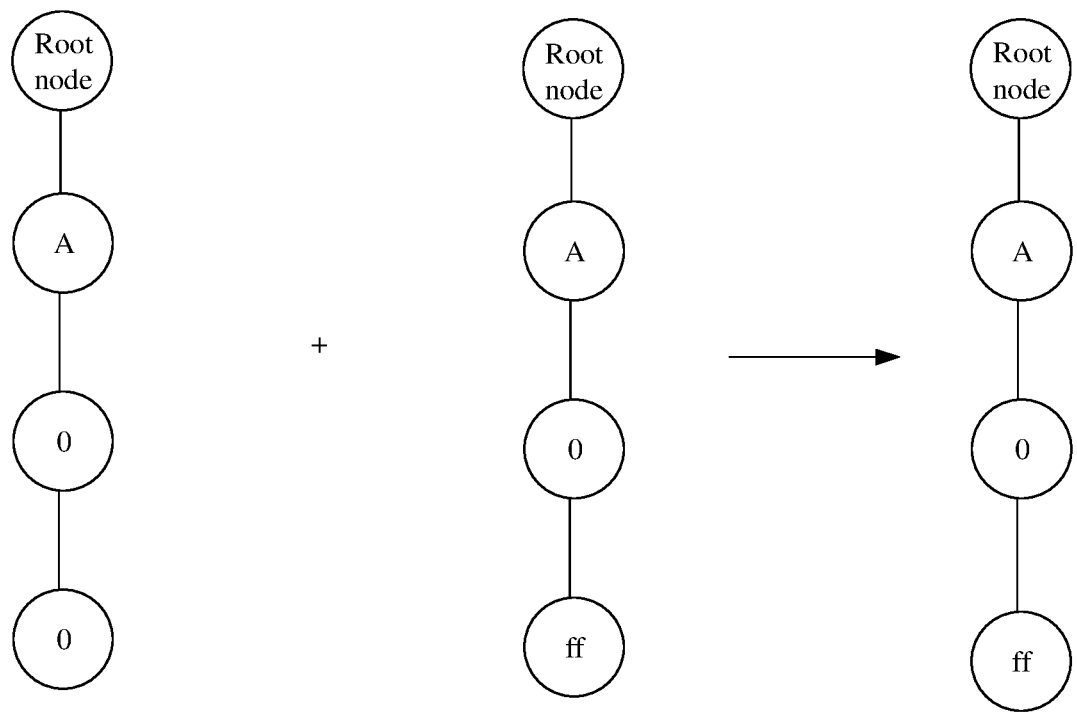
FIG. 12 is an example schematic diagram of another prefix tree combination process according to an embodiment of this application.

For example, FIG. 12 is a schematic diagram of a prefix tree combination process in this scenario.

A diagram a in FIG. 12 illustrates the first prefix tree. The first prefix tree includes the second data index, the logical address range corresponding to the second data index is [0 bits, 7 bits], and a key in the second data index is "A00".

A diagram b in FIG. 12 illustrates the second prefix tree. The second prefix tree includes the first data index, the logical address range corresponding to the first data index is [0 bits, 31 bits], and a key in the first data index is "A0ff".

A diagram c in FIG. 12 illustrates the combined prefix tree. The combined prefix tree includes the first data index but does not include the second data index.

This is a technical solution proposed considering that "the data indicated by the second data index is old data". This is conducive to reducing storage space occupied by the data indexes, and improving garbage collection efficiency.

Scenario 3: The prefix trees are combined based on the foregoing scenario 1 and/or scenario 2. If all status bits of a data index in the combined prefix tree are marked as invalid, the storage system deletes the data index. This is a technical solution proposed considering that "data indicated by the data index is old data". This is conducive to reducing storage space occupied by the data indexes, and improving garbage collection efficiency.

Embodiment 4

For any data index (denoted as a first data index) generated based on a data index operation unit with a first length, when a quantity of the sections marked as invalid in the data index is greater than or equal to a threshold, a data index is separately generated based on a logical address range corresponding to a section that is not marked as invalid, and the first data index is deleted. This is conducive to distinguishing between new data and old data in a data query process, thereby improving data query efficiency; and this is conducive to distinguishing between new data and old data in a garbage collection process, thereby improving garbage collection efficiency.

This solution is equivalent to the following: When there are a relatively large quantity of sections marked as invalid in a data index generated based on the data index operation unit with the first length, the data index generated based on the data index operation unit with the first length is decomposed into data indexes generated based on a data index operation unit with a second length, and an invalid data index generated based on the data index operation unit with the second length (that is, a data index generated based on the date index operation unit with the second length, where data indicated by the data index is old data) is deleted. In this way, more junk data can be deleted in a garbage collection process, thereby improving garbage collection efficiency.

The solution can be applied to the garbage collection procedure. Certainly, this embodiment of this application is not limited thereto. For example, this solution can also be applied to a prefix tree combination procedure or a write operation procedure.

Figure 13:
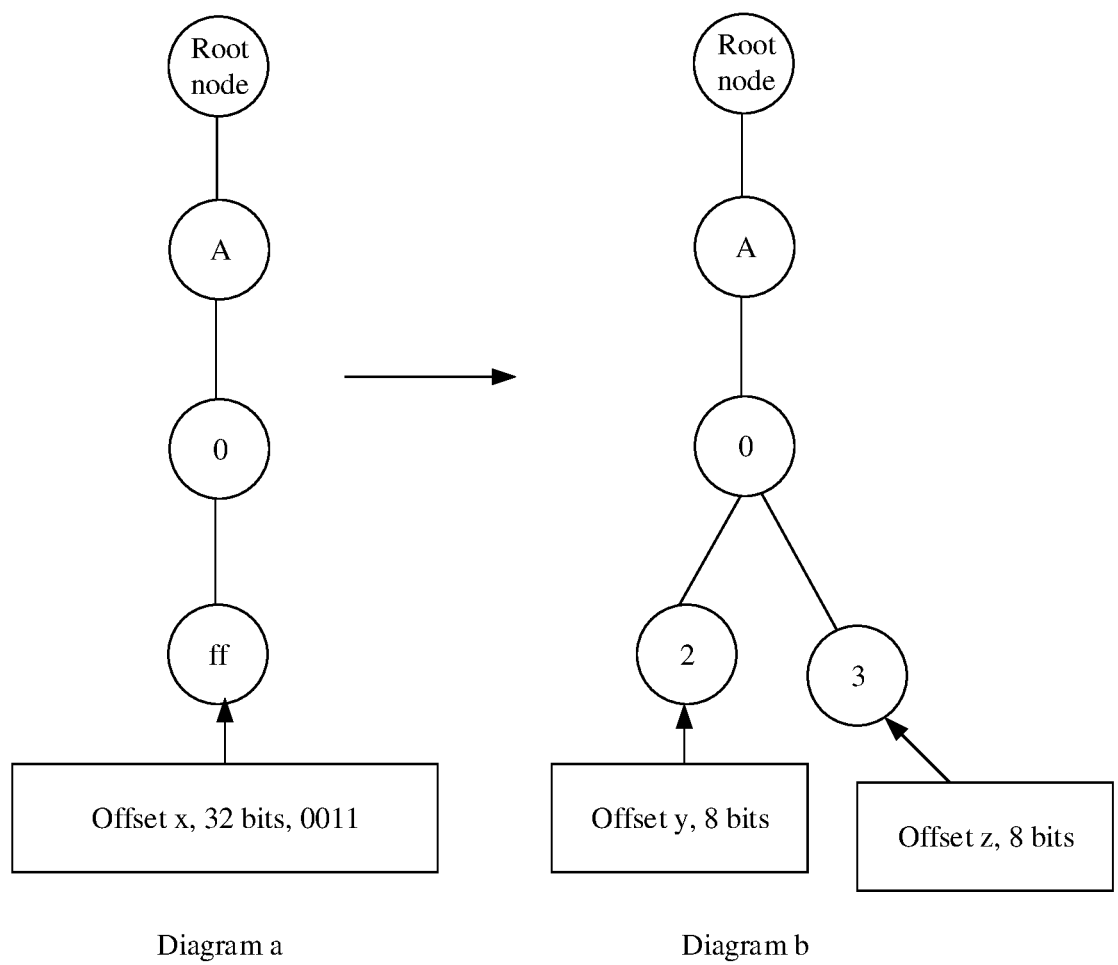
FIG. 13 is an example schematic diagram of a process of decomposing a first data index according to an embodiment of this application.

FIG. 13 is a schematic diagram of a process of decomposing a first data index according to an embodiment of this application. A diagram a in FIG. 13 shows the first data index. A leaf node includes an offset x of first data, a length of 32 bits of the first data, and a status bit 0011 that are indicated by the first data index. "0011" indicates that status bits corresponding to logical address ranges [0 bits, 7 bits], [8 bits, 15 bits], [16 bits, 23 bits], and [24 bits, 31 bits] are marked as invalid, invalid, valid, and valid respectively. Assuming that the first data index needs to be decomposed in this case, two data indexes shown in a diagram b in FIG. 13 may be obtained through decomposition. A data index is a data index corresponding to the logical address range [16 bits, 23 bits], a key in the data index is "A02", and a location is "an offset y and a length of 8 bits". Another data index is a data index corresponding to the logical address range [24 bits, 31 bits], a key in the data index is "A03", and a location is "an offset z and a length of 8 bits". In this example, the offset x is an offset of the data indicated by the first data index in a storage system, the offset y is an offset of data in the logical address range [16 bits, 23 bits] in the storage system, and the offset z is an offset of data in the logical address range [24 bits, 31 bits] in the storage system.

The foregoing provides descriptions by using an example in which the data index operation units include the data index operation unit with the first length and the data index operation unit with the second length. In extensible cases, the technical solutions provided in embodiments of this application can be applied to a scenario in which a data index operation unit with another grain is included. Embodiments of this application do not detail a specific implementation solution in which data index operation units with three or more different grains are included. For example, based on Embodiment 1, in the data index generation process, if the logical address range of the to-be-generated data index cannot be aligned with a data index operation unit with a largest grain, it is determined whether the logical address range of the to-be-generated data index is aligned with a data index operation unit with a second largest grain, and so on. In other words, the storage system generates, as far as possible, a data index based on a data index operation unit with a relatively large grain. In addition, the storage system performs, as far as possible, a padding procedure based on a data index operation unit with a relatively small grain. Other examples are not enumerated.

The foregoing mainly describes the solutions provided in embodiments of this application from a perspective of the methods. To implement the foregoing functions, the solutions provided in embodiments of this application include corresponding hardware structures and/or software modules for performing the functions. A person skilled in the art should be aware that, in combination with the examples described in embodiments disclosed in this specification, method steps can be implemented by hardware or a combination of hardware and computer software in this application. Whether a function is performed by hardware or hardware driven by computer software depends on particular applications and implementation constraints of the technical solutions. A person skilled in the art may use a different method to implement the described functions for each particular application, but it should not be considered that the implementation goes beyond the scope of this application.

In embodiments of this application, function modules of the data index management apparatus in the storage system may be obtained through division based on the foregoing method examples. For example, each function module may be obtained through division in correspondence to each function, or two or more functions may be integrated into one processing module. The integrated module may be implemented in a form of hardware, or may be implemented in a form of a software function module. It should be noted that module division in embodiments of this application is an example, is merely a logical function division, and may be other division during actual implementation.

Figure 14:
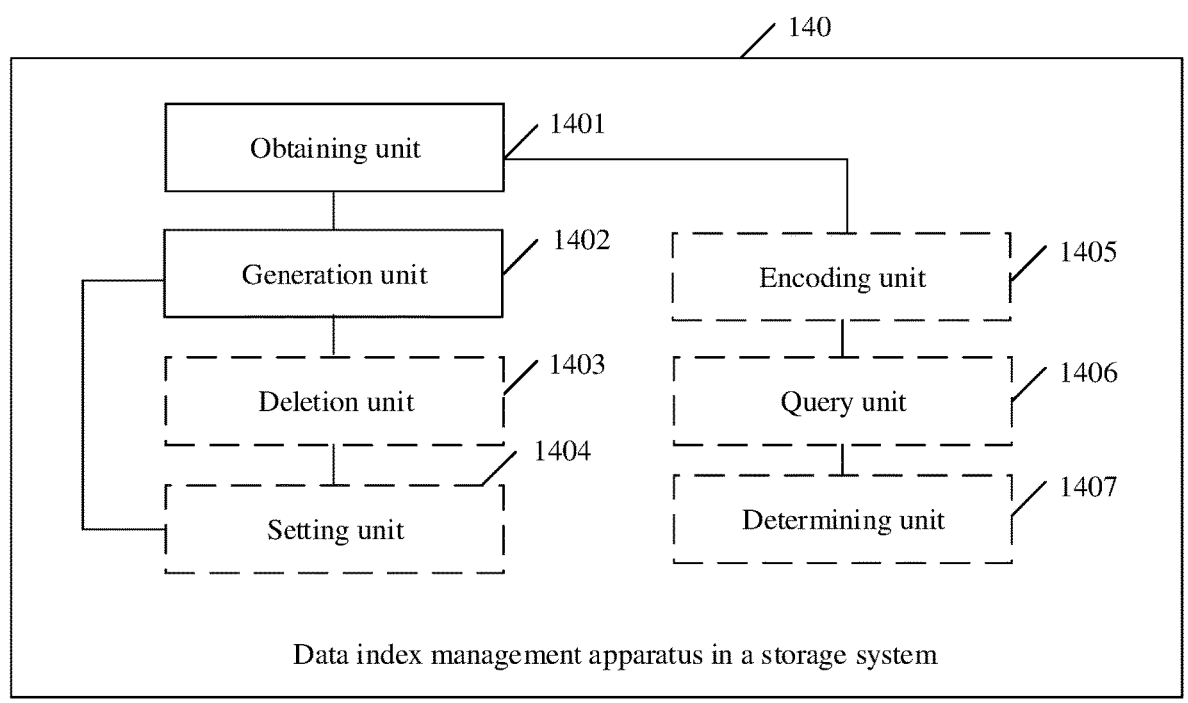
FIG. 14 is an example schematic diagram of a structure of a data index management apparatus in a storage system according to an embodiment of this application.

FIG. 14 is a schematic diagram of a structure of a data index management apparatus in a storage system according to an embodiment of this application. The data index management apparatus 140 in the storage system may be configured to perform a function performed by the storage system in any one of the foregoing embodiments (e.g., the embodiment shown in FIG. 6A and FIG. 6B or FIG. 10A and FIG. 10B). The data index management apparatus 140 in the storage system may include an obtaining unit 1401 and a generation unit 1402.

The obtaining unit 1401 is configured to obtain first to-be-written data, where a logical address range of the first to-be-written data is a first logical address range. The generation unit 1402 is configured to generate a data index based on an alignment status between a logical address range of a to-be-generated data index in the first logical address range and data index operation units with different lengths in the storage system, where the storage system includes a data index operation unit with a first length and a data index operation unit with a second length, and the first length is greater than the second length. For example, with reference to FIG. 6A and FIG. 6B, the obtaining unit 1401 may be configured to perform S103 or S104, and the generation unit 1402 may be configured to perform S105, S107, and S110.

Optionally, the generation unit 1402 is configured to: when the logical address range of the to-be-generated data index is aligned with the data index operation unit with the first length, generate a first data index for first data based on the data index operation unit with the first length, where the first data is data, in the first to-be-written data, that starts from the $1^{st}$ logical address in the logical address range of the to-be-generated data index and that is in a logical address range whose length is the first length, and the first data index includes a location of the first data in the storage system. For example, with reference to FIG. 6B, the generation unit 1402 may be configured to perform S107.

Optionally, the generation unit 1402 is configured to: when the logical address range of the to-be-generated data index is not aligned with the data index operation unit with the first length, generate a second data index for second data based on the data index operation unit with the second length, where the second data is data, in the first to-be-written data, that starts from the $1^{st}$ logical address in the logical address range of the to-be-generated data index and that is in a logical address range whose length is the second length, and the second data index includes a location of the second data in the storage system. For example, with reference to FIG. 6B, the generation unit 1402 may be configured to perform S110.

Optionally, when a length of the $1^{st}$ logical address in the logical address range of the to-be-generated data index is divisible by the first length, and a length of the logical address range of the to-be-generated data index is greater than or equal to the first length, the logical address range of the to-be-generated data index is aligned with the data index operation unit with the first length.

Optionally, the data index management apparatus 140 in the storage system further includes a deletion unit 1403 and a setting unit 1404.

Optionally, the deletion unit 1403 is configured to: after the generation unit generates the first data index for the first data based on the data index operation unit with the first length, when a first target data index already exists in the storage system, delete the first target data index, where the first target data index is a data index generated for third data based on the data index operation unit with the second length, the logical address range of the first data includes a logical address range of the third data, and the first target data index includes a location of the third data in the storage system. For example, with reference to FIG. 6B, the deletion unit 1403 may be configured to perform S109.

Optionally, the setting unit 1404 is configured to: after the generation unit generates the second data index for the second data based on the data index operation unit with the second length, when a second target data index already exists in the storage system, mark a status of a target section of the second target data index as invalid, where the second target data index is a data index generated for fourth data based on the data index operation unit with the first length, the target section is a data index generated for data in a second logical address range included in a logical address range of the fourth data, and the second logical address range is the same as the logical address range of the second data. For example, with reference to FIG. 6B, the setting unit 1404 may be configured to perform S112.

Optionally, the deletion unit 1403 is configured to delete the second target data index when statuses of all sections of the second target data index are marked as invalid.

Optionally, the deletion unit 1403 is configured to: when a quantity of sections in an invalid state in all sections of the second target data index is greater than or equal to a threshold, generate a new data index from a section in a valid state in all the sections, and delete the second target data index.

Optionally, the obtaining unit 1401 is further configured to obtain a to-be-queried logical address range. The apparatus further includes an encoding unit 1405, a query unit 1406, and a determining unit 1407. The encoding unit 1405 is configured to encode the to-be-queried logical address range based on the second length, to obtain a first encoding result. The query unit 1406 is configured to query the second data index based on the first encoding result, where the second data index includes the first encoding result. The determining unit 1407 is configured to determine data in the to-be-queried logical address range based on the data indicated by the second data index. For example, with reference to FIG. 10A, the obtaining unit 1401 may be configured to perform S201, and the encoding unit 1405 may be configured to perform S202. The query unit 1406 may be configured to perform S203, and the determining unit 1407 may be configured to perform S204.

Optionally, the encoding unit 1405 is further configured to: when the first encoding result does not exist in the storage system, encode the to-be-queried logical address range based on the first length, to obtain a second encoding result. The query unit 1406 is further configured to query the first data index based on the second encoding result, where the first data index includes the second encoding result. The determining unit 1407 is further configured to determine the data in the to-be-queried logical address range based on the data indicated by the first data index. For example, with reference to FIG. 10A, the encoding unit 1405 may be configured to perform S205. The query unit 1406 may be configured to perform S206, and the determining unit 1407 may be configured to perform S207.

In an example, referring to FIG. 2 and FIG. 3, the data index management apparatus 140 in the storage system may be the storage controller 201. Referring to FIG. 3, some or all of the foregoing units (for example, the obtaining unit 1401, the generation unit 1402, the deletion unit 1403, the setting unit 1404, the encoding unit 1405, and the query unit 1406) may be implemented by the processor 301 by invoking the computer program instructions stored in the memory 302.

In another example, referring to FIG. 4, the data index management apparatus 140 in the storage system may be a server. Referring to FIG. 5, some or all of the foregoing units (for example, the obtaining unit 1401, the generation unit 1402, the deletion unit 1403, the setting unit 1404, the encoding unit 1405, and the query unit 1406) may be implemented by the processor 501 by invoking the computer program instructions stored in the memory 502.

For specific descriptions of the optional manners, refer to the method embodiments. In addition, for interpretations of any data index management apparatus 140 in the storage system provided above and descriptions of beneficial effects thereof, refer to the foregoing corresponding method embodiments.

It should be noted that an action correspondingly performed by each module is merely a specific example. For an action actually performed by each module, refer to the actions or the steps mentioned in the descriptions of the embodiment based on FIG. 6A and FIG. 6B or FIG. 10A and FIG. 10B.

An embodiment of this application further provides a computer-readable storage medium. The computer-readable storage medium stores computer program instructions, and when the computer program instructions are run on a computer, the computer is enabled to perform the actions or the steps mentioned in any one of the embodiments provided above.

An embodiment of this application further provides a chip. The chip integrates a circuit and one or more interfaces for implementing functions of the data index management apparatus 140 in the storage system. Optionally, functions supported by the chip may include the processing actions in the embodiment based on FIG. 3 or FIG. 10A and FIG. 10B. A person of ordinary skill in the art can understand that all or some of the steps in the foregoing embodiments may be implemented by computer program instructions instructing related hardware. The computer program instructions may be stored in a computer-readable storage medium. The storage medium mentioned above may be a read-only memory, a random access memory, or the like. The processing unit or the processor may be a central processing unit, a general-purpose processor, an application-specific integrated circuit (ASIC), a digital signal processor (DSP), a field-programmable gate array (FPGA), another programmable logic device, a transistor logic device, a hardware component, or any combination thereof.

An embodiment of this application further provides a computer program product including computer program instructions. When the computer program instructions are run on a computer, the computer is enabled to perform any method in the foregoing embodiments. The computer program product includes one or more computer program instructions. When the computer program instructions are loaded and executed on a computer, the procedure or functions according to embodiments of this application are completely or partially generated. The computer may be a general-purpose computer, a special-purpose computer, a computer network, or another programmable apparatus. The computer program instructions may be stored in a computer-readable storage medium or may be transmitted from a computer-readable storage medium to another computer-readable storage medium. For example, the computer program instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, an SSD), or the like.

It should be noted that, the foregoing devices that are provided in embodiments of this application and that are configured to store the computer program instructions, for example, but not limited to, the foregoing memory, computer-readable storage medium, and communications chip, are all non-transitory.

In a process of implementing this application that claims protection, a person skilled in the art can understand and implement other variations of the disclosed embodiments by viewing the accompanying drawings, the disclosed content, and the appended claims. In the claims, "comprising" does not exclude other components or other steps, and "a" or "one" does not exclude a meaning of plurality. A single processor or another unit may implement several functions enumerated in the claims. Some measures are recorded in dependent claims that are different from each other, but this does not mean that these measures cannot be combined to produce a desirable effect.

What is claimed is:

1. A data index management method, comprising:
obtaining first to-be-written data, wherein a logical address range of the first to-be-written data includes a first logical address range; and
generating a data index based on an alignment status between a logical address range of a to-be-generated data index in the first logical address range and data index operation units with different lengths in a storage system, wherein
the storage system comprises a data index operation unit with a first length and a data index operation unit with a second length,
the first length is greater than the second length,
a data index operation unit is a length of data indicated by the data index, and
generating the data index comprises:
in association with the logical address range of the to-be-generated data index being aligned with the data index operation unit with the first length, generating a first data index for first data based on the data index operation unit with the first length, wherein the first data is included in the first to-be-written data, and the first data starts from a $1^{st}$ logical address in the logical address range of the to-be-generated data index and is in a logical address range whose length is the first length, and the first data index comprises a location of the first data in the storage system.

2. The method according to claim 1, wherein generating the data index comprises:
when the logical address range of the to-be-generated data index is not aligned with the data index operation unit with the first length, generating a second data index for second data based on the data index operation unit with the second length, wherein
the second data is included in the first to-be-written data, and the second data starts from the $1^{st}$ logical address in the logical address range of the to-be-generated data index and is in a logical address range whose length is the second length, and
the second data index comprises a location of the second data in the storage system.

3. The method according to claim 1, wherein when a length of the $1^{st}$ logical address in the logical address range of the to-be-generated data index is divisible by the first length, and a length of the logical address range of the to-be-generated data index is greater than or equal to the first length, the logical address range of the to-be-generated data index is aligned with the data index operation unit with the first length.

4. The method according to claim 1, wherein after generating the first data index for first data based on the data index operation unit with the first length, the method further comprises:
when a first target data index already exists in the storage system, deleting the first target data index, wherein
the first target data index is generated for third data based on the data index operation unit with the second length,
the logical address range of the first data comprises a logical address range of the third data, and the first target data index comprises a location of the third data in the storage system.

5. The method according to claim 2, wherein after generating the second data index for second data based on the data index operation unit with the second length, the method further comprises:
when a second target data index already exists in the storage system, marking a status of a target section of the second target data index as invalid, wherein
the second target data index is generated for fourth data based on the data index operation unit with the first length,
the target section is a data index generated for data in a second logical address range comprised in a logical address range of the fourth data, and
the second logical address range is the same as the logical address range of the second data.

6. The method according to claim 5, further comprising:
deleting the second target data index when statuses of all sections of the second target data index are marked as invalid.

7. The method according to claim 5, further comprising:
when a quantity of sections in an invalid state in all sections of the second target data index is greater than or equal to a threshold, generating a new data index from a section in a valid state in all the sections, and deleting the second target data index.

8. The method according to claim 2, further comprising:
obtaining a to-be-queried logical address range;
encoding the to-be-queried logical address range based on the second length, to obtain a first encoding result;
querying the second data index based on the first encoding result, wherein the second data index comprises the first encoding result; and
determining data in the to-be-queried logical address range based on the data indicated by the second data index, wherein the method further comprises:
when the first encoding result does not exist in the storage system, encoding the to-be-queried logical address range based on the first length, to obtain a second encoding result;
querying the first data index based on the second encoding result, wherein the first data index comprises the second encoding result; and
determining the data in the to-be-queried logical address range based on the data indicated by the first data index.

9. A data index management apparatus, comprising:
a processor; and
a memory configured to store computer program instructions that, when executed by the processor, cause the processor to:
obtaining first to-be-written data, wherein a logical address range of the first to-be-written data includes a first logical address range; and
generating a data index based on an alignment status between a logical address range of a to-be-generated data index in the first logical address range and data index operation units with different lengths in a storage system, wherein
the storage system comprises a data index operation unit with a first length and a data index operation unit with a second length, and
a data index operation unit is a length of data indicated by the data index, and generating the data index comprises:
in association with the logical address range of the to-be-generated data index being aligned with the data index operation unit with the first length, generating a first data index for first data based on the data index operation unit with the first length, wherein the first data is included in the first to-be-written data, and the first data starts from a $1^{st}$ logical address in the logical address range of the to-be-generated data index and is in a logical address range whose length is the first length, and the first data index comprises a location of the first data in the storage system.

10. The apparatus according to claim 9, wherein the processor is further caused to:
when the logical address range of the to-be-generated data index is not aligned with the data index operation unit with the first length, generate a second data index for second data based on the data index operation unit with the second length, wherein
the second data is included in the first to-be-written data, and the second data starts from the $1^{st}$ logical address in the logical address range of the to-be-generated data index and is in a logical address range whose length is the second length, and
the second data index comprises a location of the second data in the storage system.

11. The apparatus according to claim 9, wherein when a length of the $1^{st}$ logical address in the logical address range of the to-be-generated data index is divisible by the first length, and a length of the logical address range of the to-be-generated data index is greater than or equal to the first length, the logical address range of the to-be-generated data index is aligned with the data index operation unit with the first length.

12. The apparatus according to claim 9, wherein the processor is further caused to:
when a first target data index already exists in the storage system, delete the first target data index, wherein
the first target data index is generated for third data based on the data index operation unit with the second length,
the logical address range of the first data comprises a logical address range of the third data, and
the first target data index comprises a location of the third data in the storage system.

13. The apparatus according to claim 10, wherein the processor is further caused to:
when a second target data index already exists in the storage system, mark a status of a target section of the second target data index as invalid, wherein
the second target data index is generated for fourth data based on the data index operation unit with the first length,
the target section is a data index generated for data in a second logical address range comprised in a logical address range of the fourth data, and
the second logical address range is the same as the logical address range of the second data.

14. The apparatus according to claim 13, wherein the processor is further caused to:
delete the second target data index when statuses of all sections of the second target data index are marked as invalid.

15. The apparatus according to claim 13, wherein the processor is further caused to:
when a quantity of sections in an invalid state in all sections of the second target data index is greater than or equal to a threshold, generate a new data index from a section in a valid state in all the sections, and delete the second target data index.

16. The apparatus according to claim 10, wherein the processor is further caused to:
   obtain a to-be-queried logical address range;
   encode the to-be-queried logical address range based on the second length, to obtain a first encoding result;
   query the second data index based on the first encoding result, wherein the second data index comprises the first encoding result;
   determine data in the to-be-queried logical address range based on the data indicated by the second data index.

17. A non-transitory computer readable storage medium configured to store computer readable instructions that, when executed by a processor, cause the processor to provide execution comprising:
   obtaining first to-be-written data, wherein a logical address range of the first to-be-written data includes a first logical address range; and
   generating a data index based on an alignment status between a logical address range of a to-be-generated data index in the first logical address range and data index operation units with different lengths in a storage system, wherein
   the storage system comprises a data index operation unit with a first length and a data index operation unit with a second length,
   a data index operation unit is a length of data indicated by the data index, and
   generating the data index comprises:
      in association with the logical address range of the to-be-generated data index being aligned with the data index operation unit with the first length, generating a first data index for first data based on the data index operation unit with the first length, wherein the first data is included in the first to-be-written data, and the first data starts from a $1^{st}$ logical address in the logical address range of the to-be-generated data index and is in a logical address range whose length is the first length, and the first data index comprises a location of the first data in the storage system.

18. The method according to claim 1, wherein when a first logical address in the logical address range is divisible by the second length, and a length of the logical address range is an integer multiple of the second length, the first to-be-written data does not require padding, and
   when the first logical address in the logical address range is not divisible by the second length, or the length of the logical address range is not an integer multiple of the second length, the first to-be-written data requires padding.

* * * * *